(12) United States Patent
Sharma et al.

(10) Patent No.: US 11,420,755 B2
(45) Date of Patent: Aug. 23, 2022

(54) SHAPE MEMORY ALLOY ISOLATOR FOR A GAS TURBINE ENGINE

(71) Applicant: General Electric Company, Schenectady, NY (US)

(72) Inventors: Praveen Sharma, Bangalore (IN); Vinod Shashikant Chaudhari, Bangalore (IN); Sivakumar Mahesh, Bangalore (IN); Bhujabal Prashant Mahadeo, Bangalore (IN); Mohan Kannaiah Raju, Bengaluru (IN); Ravindra Shankar Ganiger, Bangalore (IN); Jagadisha Pai Nagarmat, Bengaluru (IN); Shivam Mittal, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 538 days.

(21) Appl. No.: 16/535,315

(22) Filed: Aug. 8, 2019

(65) Prior Publication Data
US 2021/0039799 A1 Feb. 11, 2021

(51) Int. Cl.
*B64D 27/26* (2006.01)
*F02C 7/20* (2006.01)
*F16F 9/52* (2006.01)

(52) U.S. Cl.
CPC ............ *B64D 27/26* (2013.01); *F02C 7/20* (2013.01); *F16F 9/52* (2013.01);
(Continued)

(58) Field of Classification Search
None
See application file for complete search history.

(56) References Cited

U.S. PATENT DOCUMENTS

| 2,445,661 A | 7/1948 | Constant et al. |
| 2,722,391 A * | 11/1955 | Krieghoff ............... F16F 1/406 248/556 |

(Continued)

FOREIGN PATENT DOCUMENTS

| CA | 2841592 A1 | 10/2014 |
| CA | 2861292 A1 | 6/2015 |

(Continued)

OTHER PUBLICATIONS

Stebner, Development, Characterization, and Application of Ni19.5Ti50.5Pd25Pt5 High-Temperature Shape Memory Alloy Helical Actuators, Engineering, Aerospace, Thesis, Dec. 2007, 110 Pages.

(Continued)

*Primary Examiner* — Michael Lebentritt
(74) *Attorney, Agent, or Firm* — Dority & Manning, P.A.

(57) ABSTRACT

A vibration isolation system for a gas turbine engine. The vibration isolation system includes a first fixed structure and a second fixed structure separate from the first fixed structure. The vibration isolation system further includes a connector coupling the first fixed structure to the second fixed structure. Additionally, the vibration isolation system includes an isolator, including a shape memory alloy material, associated with the connector. The isolator is arranged between the first fixed structure and the second fixed structure such that the isolator reduces vibrations transferred between the first fixed structure and the second fixed structure.

20 Claims, 12 Drawing Sheets

(52) U.S. Cl.
CPC .... *B64D 2027/268* (2013.01); *F05D 2240/90* (2013.01); *F05D 2260/96* (2013.01); *F05D 2300/505* (2013.01); *F16F 2224/0258* (2013.01)

(56) References Cited

U.S. PATENT DOCUMENTS

| | | | |
|---|---|---|---|
| 4,097,011 A * | 6/1978 | White | B64D 27/26 248/557 |
| 4,289,061 A | 9/1981 | Emmett | |
| 4,451,110 A | 5/1984 | Forestier et al. | |
| 4,496,252 A | 1/1985 | Horler et al. | |
| 4,854,525 A * | 8/1989 | Chee | B64D 27/18 60/797 |
| 4,875,655 A * | 10/1989 | Bender | F02C 7/20 244/54 |
| 4,897,006 A | 1/1990 | Blin | |
| 4,991,991 A | 2/1991 | Ito et al. | |
| 5,010,949 A | 4/1991 | Dehaine | |
| 5,028,001 A * | 7/1991 | Bender | F02C 7/20 D12/345 |
| 5,064,144 A * | 11/1991 | Chee | B64D 27/20 244/54 |
| 5,088,840 A | 2/1992 | Radtke | |
| 5,160,233 A | 11/1992 | McKinnis | |
| 5,239,822 A * | 8/1993 | Buchacher | B64D 29/00 244/110 B |
| 5,320,134 A | 6/1994 | Singh | |
| 5,366,254 A | 11/1994 | Tucchio et al. | |
| 5,484,244 A | 1/1996 | Glovan et al. | |
| 5,974,782 A | 11/1999 | Gerez | |
| 6,009,701 A | 1/2000 | Freeman et al. | |
| 6,082,959 A | 7/2000 | Van Duyn | |
| 6,099,165 A | 8/2000 | Tremaine | |
| 6,109,022 A | 8/2000 | Allen et al. | |
| 6,126,371 A | 10/2000 | McCloskey | |
| 6,240,719 B1 | 6/2001 | Vondrell et al. | |
| 6,250,615 B1 * | 6/2001 | Lei | F16F 13/10 267/140.13 |
| 6,325,546 B1 | 12/2001 | Storace | |
| 6,428,634 B1 | 8/2002 | Besselink et al. | |
| 6,491,497 B1 | 12/2002 | Allmon et al. | |
| 6,494,032 B2 | 12/2002 | Udall et al. | |
| 6,783,319 B2 | 8/2004 | Doerflein et al. | |
| 6,796,408 B2 | 9/2004 | Sherwin et al. | |
| 6,799,416 B2 | 10/2004 | Plona et al. | |
| 7,004,047 B2 | 2/2006 | Rey et al. | |
| 7,097,413 B2 | 8/2006 | VanDuyn | |
| 7,195,444 B2 | 3/2007 | Brault et al. | |
| 7,216,831 B2 | 5/2007 | Wood | |
| 7,288,326 B2 | 10/2007 | Elzey et al. | |
| 7,404,678 B2 | 7/2008 | Plona | |
| 7,448,808 B2 | 11/2008 | Bouchy et al. | |
| 7,669,799 B2 | 3/2010 | Elzey et al. | |
| 7,699,556 B2 | 4/2010 | Efremov | |
| 7,749,341 B2 | 7/2010 | Noebe et al. | |
| 7,832,193 B2 | 11/2010 | Orlando et al. | |
| 7,926,259 B2 | 4/2011 | Orlando et al. | |
| 8,100,638 B2 | 1/2012 | Udall | |
| 8,128,339 B2 | 3/2012 | Kondo et al. | |
| 8,136,999 B2 | 3/2012 | Mons et al. | |
| 8,167,531 B2 | 5/2012 | Mollmann et al. | |
| 8,225,478 B2 | 7/2012 | Kane | |
| 8,246,255 B2 | 8/2012 | Raberin et al. | |
| 8,267,650 B2 | 9/2012 | Alam et al. | |
| 8,291,710 B2 | 10/2012 | Webster | |
| 8,371,802 B2 | 2/2013 | Udall | |
| 8,403,634 B2 | 3/2013 | Arness et al. | |
| 8,409,691 B1 | 4/2013 | Henry et al. | |
| 8,430,622 B2 | 4/2013 | Webster et al. | |
| 8,434,293 B2 | 5/2013 | Widdle, Jr. et al. | |
| 8,591,196 B2 | 11/2013 | Hardwicke | |
| 8,662,756 B2 | 3/2014 | Care et al. | |
| 8,814,097 B2 | 8/2014 | Schnitzer | |
| 8,834,095 B2 | 9/2014 | Davis | |
| 8,945,325 B2 | 2/2015 | Everhart et al. | |
| 8,986,146 B2 | 3/2015 | Gallet | |
| 9,140,137 B2 | 9/2015 | Mayer et al. | |
| 9,180,982 B2 | 11/2015 | Baghasarian | |
| 11,286,883 B2 * | 3/2022 | Suciu | F02C 9/20 |
| 2006/0169857 A1 | 8/2006 | Hawkins et al. | |
| 2006/0269357 A1 | 11/2006 | Webb | |
| 2008/0181763 A1 | 7/2008 | Webster et al. | |
| 2008/0213062 A1 | 9/2008 | Johnson et al. | |
| 2009/0056343 A1 * | 3/2009 | Suciu | B64D 27/18 60/797 |
| 2009/0148274 A1 | 6/2009 | Kostka et al. | |
| 2009/0185768 A1 | 7/2009 | Mons et al. | |
| 2009/0314881 A1 * | 12/2009 | Suciu | B64D 27/26 244/54 |
| 2010/0011493 A1 | 1/2010 | Wiig et al. | |
| 2011/0150378 A1 | 6/2011 | Care et al. | |
| 2012/0056005 A1 | 3/2012 | Webster | |
| 2012/0198815 A1 * | 8/2012 | Suciu | F02C 3/107 60/226.3 |
| 2012/0198816 A1 * | 8/2012 | Suciu | B64D 27/26 60/226.3 |
| 2012/0198817 A1 * | 8/2012 | Suciu | B64D 27/26 60/226.3 |
| 2013/0014490 A1 * | 1/2013 | Suciu | F01D 5/06 60/226.3 |
| 2013/0074517 A1 * | 3/2013 | Suciu | B64D 27/26 60/797 |
| 2013/0160459 A1 * | 6/2013 | Thies | F02C 7/20 29/888.02 |
| 2013/0324343 A1 | 12/2013 | Gallet | |
| 2014/0174056 A1 * | 6/2014 | Suciu | F01D 25/24 60/226.1 |
| 2014/0366555 A1 * | 12/2014 | Beier | F02C 7/32 60/796 |
| 2014/0373555 A1 * | 12/2014 | Beier | G01M 15/14 60/796 |
| 2015/0144256 A1 | 5/2015 | Fabre et al. | |
| 2016/0167797 A1 * | 6/2016 | Stretton | F02C 7/20 244/54 |
| 2016/0229519 A1 | 8/2016 | Dilligan et al. | |
| 2017/0218808 A1 * | 8/2017 | Kurokawa | F02M 26/22 |
| 2017/0218832 A1 * | 8/2017 | Kurokawa | B62D 25/04 |
| 2017/0225561 A1 * | 8/2017 | Komiya | B60K 15/067 |
| 2017/0234157 A1 | 8/2017 | Khan et al. | |
| 2018/0112554 A1 | 4/2018 | Ghosh et al. | |
| 2018/0112672 A1 | 4/2018 | Ganiger et al. | |
| 2018/0298822 A1 | 10/2018 | AC et al. | |
| 2019/0308741 A1 * | 10/2019 | Dittmar | F01C 20/24 |
| 2021/0039799 A1 * | 2/2021 | Sharma | B64D 27/12 |

FOREIGN PATENT DOCUMENTS

| | | |
|---|---|---|
| EP | 1130243 A2 | 9/2001 |
| EP | 1344896 A1 | 9/2003 |
| EP | 2339131 A1 | 6/2011 |
| EP | 3115551 A1 | 1/2017 |
| FR | 2888621 A1 | 1/2007 |
| FR | 2938874 A1 | 11/2008 |
| WO | WO2010/001716 A1 | 1/2010 |
| WO | WO2017/205315 A1 | 11/2017 |

OTHER PUBLICATIONS

Barbarino et al., A review on shape memory alloys with applications to morphing aircraft, Smart Materials and Structures, vol. 23, Issue: 6, Apr. 10, 2014, 19 Pages.

Wischt et al., Variable Stiffness Technique for Turbomachinery using Shape Memory Alloys, 56th AIAA/ASCE/AHS/ASC Structures, Structural Dynamics, and Materials Conference, Florida, Jan. 2015, 13 Pages.

Co-Pending Application Serial No. 201640122484 filed Jun. 30, 2016.

Co-Pending Application U.S. Appl. No. 15/811,169, filed Nov. 13, 2017.

(56) References Cited

OTHER PUBLICATIONS

Co-Pending Application U.S. Appl. No. 15/823,631, filed Nov. 28, 2017.
SMB Bearings, United Kingdom, 2018, 1 page. https://www.smbbearings.com/downloads.
YouTube Video (Website Link Only) https://www.youtube.com/watch?y=X2KCs_IBKWU.
GE Co-Pending Application No. 201640122484 filed Jun. 30, 2016.

* cited by examiner

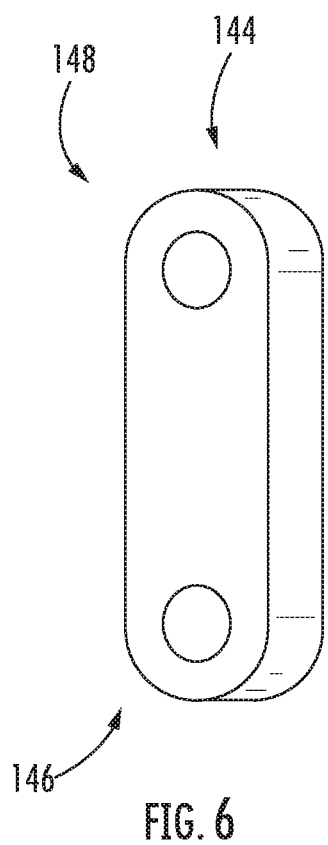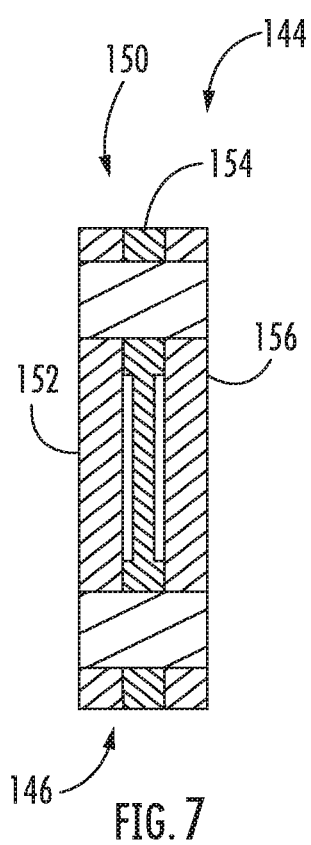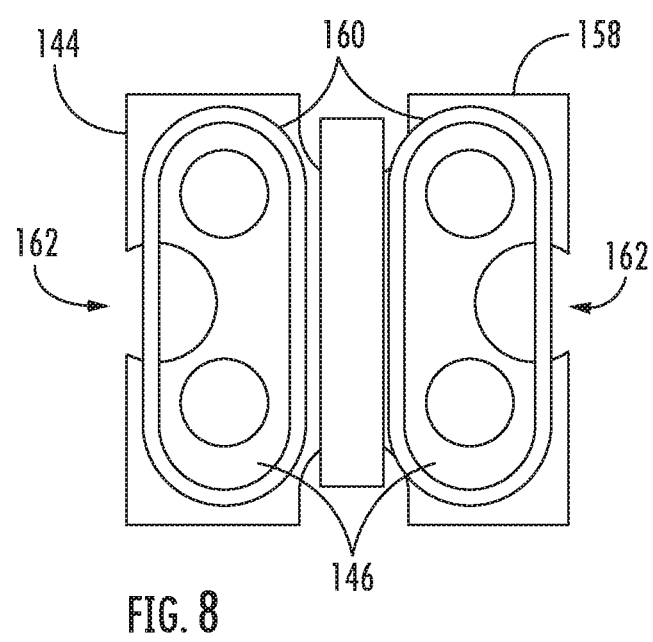

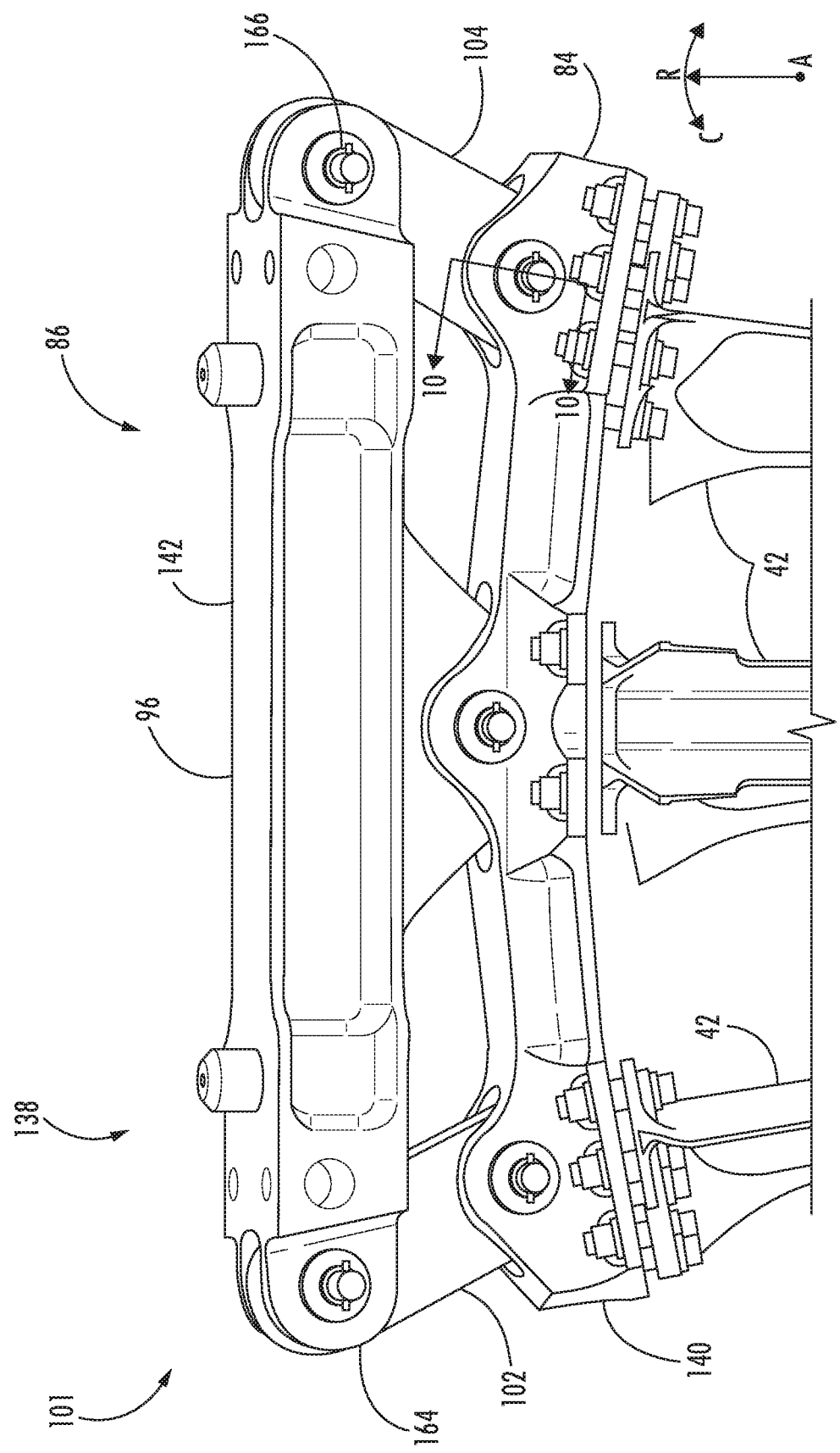

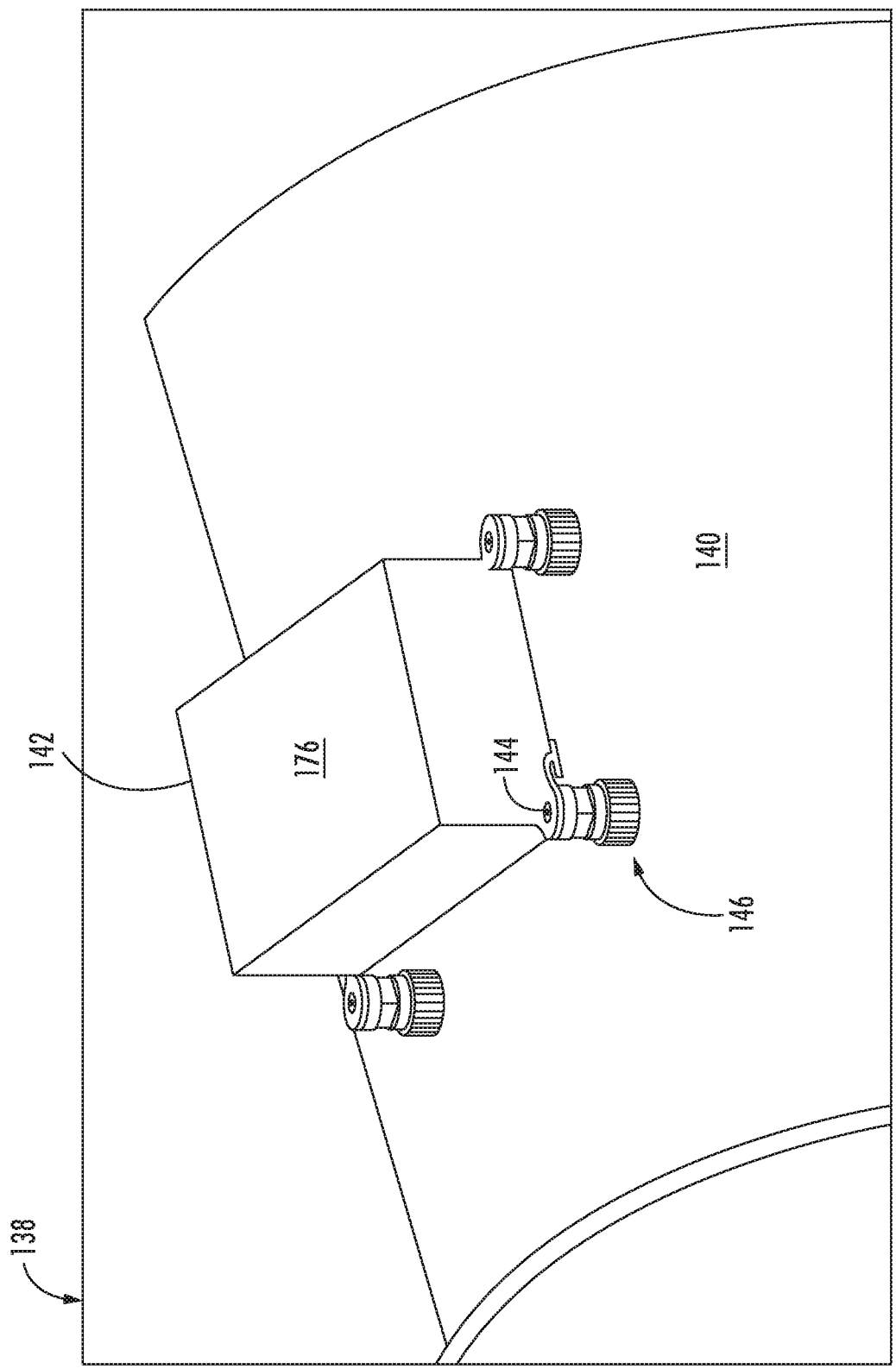

SHAPE MEMORY ALLOY ISOLATOR FOR A GAS TURBINE ENGINE

FIELD

The present subject matter relates generally to isolators for a gas turbine engine, or more particularly to isolators including a shape memory alloy ("SMA") material.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Turbofan gas turbine engines typically include a fan assembly that channels air to the core gas turbine engine, such as an inlet to the compressor section, and to a bypass duct. Gas turbine engines, such as turbofans, generally include fan cases surrounding the fan assembly including the fan blades.

The gas turbine engine is generally attached to the aircraft utilizing an engine mount structure. Further, components of the gas turbine engine are typically attached to static structures of the gas turbine engine. Vibration isolation between the gas turbine engine and the aircraft as well as between the components of the gas turbine engine and the static structure may generally be required to reduce load transfer, reduce engine vibration noise (EVRN), and reduce shocks transferred between the components and the gas turbine and/or between the gas turbine engine and the aircraft. However, current isolator design is generally complex and may result in multiple failures in use. Further, current isolators may respond consistently even though vibrations and shocks transferred through such isolators may behave in a non-linear fashion. Additionally, current isolators tend to loose stiffness when exposed to high temperatures, such as those associated with a gas turbine engine.

As such, a need exists for an improved isolator for a gas turbine engine that allows for adaptive stiffness, improves vibration, shock, and noise damping, and maintains stiffness at high temperatures.

BRIEF DESCRIPTION

Aspects and advantages will be set forth in part in the following description, or may be obvious from the description, or may be learned through practice of the invention.

In one aspect, the present subject matter is directed to a vibration isolation system for a gas turbine engine. The vibration isolation system includes a first fixed structure and a second fixed structure separate from the first fixed structure. The vibration isolation system further includes a connector coupling the first fixed structure to the second fixed structure. Additionally, the vibration isolation system includes an isolator, including a shape memory alloy material, associated with the connector. The isolator is arranged between the first fixed structure and the second fixed structure such that the isolator reduces vibrations transferred between the first fixed structure and the second fixed structure.

In one embodiment, the first fixed structure may include a fixed frame of the gas turbine engine. In one such embodiment, the second fixed structure may include an engine component associated with the gas turbine engine. In another such embodiment, the second fixed structure may include an engine mount structure.

In a further embodiment, the connector may include the isolator. In an additional embodiment, the isolator may include one or more of a link, a tab, or a coating applied to an exterior surface of one or more of the first fixed structure, the second fixed structure, or the connector. In another embodiment, the isolator may include a washer. In one such embodiment, the washer may include a first ring, a second ring axially aligned with the first ring, and a plurality of members extending between the first ring and the second ring. In another such embodiment, the washer may define one or more slots recessed within the washer. In one embodiment, the connector may include at least one of a bolt or pin. In such an embodiment, the isolator may include a sleeve arranged along an exterior surface of the bolt and/or pin. In another such embodiment, the isolator may include two or more sleeves arranged along the exterior surface of the bolt and/or pin. In such an embodiment, the isolator may further include one or more wedges arranged between adjacent sleeves. In additional or alternative embodiments, the isolator may be prestressed.

In another aspect, the present subject matter is directed to a vibration isolation system for a component of a gas turbine engine. The vibration isolation system includes a fixed frame of the gas turbine engine and an engine component associated with the gas turbine engine. The vibration isolation system further includes one or more connectors coupling the engine component to the fixed frame. The vibration isolation system additionally includes one or more isolators each including a shape memory alloy material. Moreover, the isolator(s) is associated with the connector(s) and arranged between the fixed frame and the engine component such that the isolator(s) reduces vibrations transferred between the fixed frame and the engine component.

In one embodiment, the isolator(s) may include one or more of a washer, a link, or a coating. The coating may be applied to an exterior surface of one or more of the fixed frame, the engine component, or the connector(s). It should be further understood that the vibration isolation system may further include any of the additional features as described herein.

In a further aspect, the present subject matter is directed to a vibration isolation system for an engine mount of a gas turbine engine. The vibration isolation system includes a fixed frame of the gas turbine engine and an engine mount structure. The vibration isolation system further includes one or more connectors coupling the fixed frame to the engine mount structure. The vibration isolation system further includes one or more isolators each including a memory shape alloy material. Moreover, the isolator(s) is associated with the connector(s) and is arranged between the fixed frame and the engine mount structure such that the isolator(s) reduces vibrations transferred between the fixed frame and the engine mount structure.

In one embodiment, the isolator(s) may include one or more links, tabs, or sleeves. In one particular embodiment, the engine mount structure may include a fan frame yoke. In such an embodiment, the connector(s) may include a platform, and the isolator(s) may include a tab arranged between the platform and the fixed frame. In another embodiment, the engine mount structure may include a rear mount member. In such an embodiment, the connector(s) and the isolator(s) together may include a link coupled between the rear mount member and the fixed frame.

In a further embodiment, the engine mount structure may include a front mount member. In such an embodiment, the connector(s) may include at least one of a bolt or pin, and the isolator(s) may include a sleeve arranged along an exterior surface of the bolt and/or pin. In another such embodiment, the isolator(s) may include two or more sleeves arranged along the exterior surface of the bolt and/or pin. In such an embodiment, the isolator(s) may further include one or more wedges arranged between adjacent sleeves. It should be further understood that the vibration isolation system may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 6 illustrates an isolator including an SMA material in accordance with aspects of the present subject matter, particularly illustrating the isolator configured as a monolithic link;

FIG. 7 illustrates an isolator including an SMA material in accordance with aspects of the present subject matter, particularly illustrating the isolator configured as a segmented link;

FIG. 8 illustrates an isolator including an SMA material in accordance with aspects of the present subject matter, particularly illustrating the isolator configured as a tab;

FIG. 9 illustrates an embodiment of the vibration isolation system in accordance with aspects of the present subject matter, particularly illustrating the vibration isolation system utilized with a front mount member of the engine mount structure;

FIG. 12 illustrates a schematic view of another embodiment of the vibration isolation system in accordance with aspects of the present subject matter, particularly illustrating the vibration isolation system utilized with an engine component of the gas turbine engine;

Figure 1:
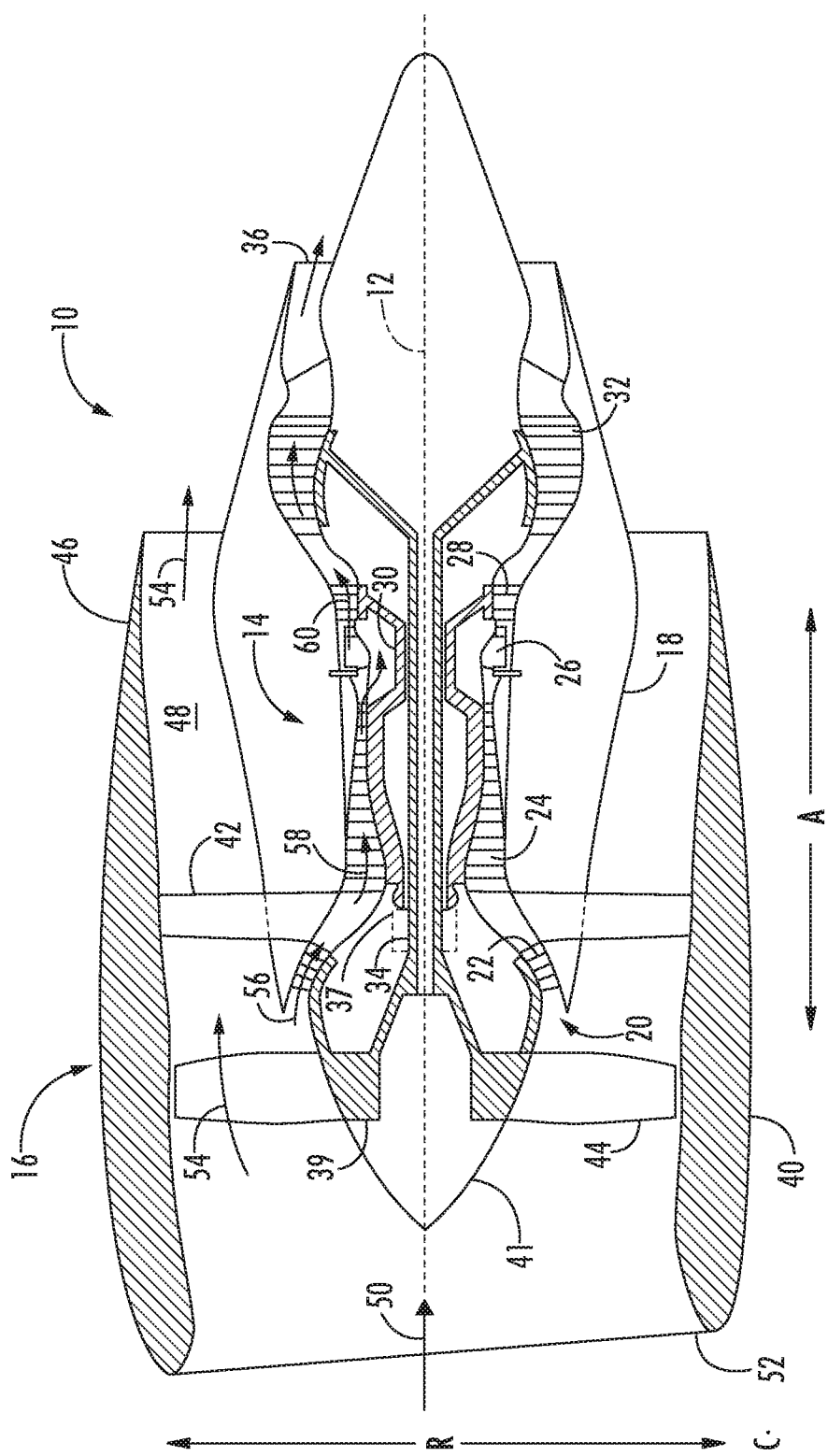
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A vibration isolation system for a gas turbine engine is generally provided. The vibration isolation system includes a first fixed structure and a second fixed structure separate from the first fixed structure. For instance, the first fixed structure may be a fixed frame of the gas turbine engine. In certain embodiments, the second fixed structure may be a mounting structure associated with the gas turbine engine. In an alternative embodiment, the second fixed structure may be an engine component associated with the gas turbine engine. The vibration isolation system further includes a connector coupling the first fixed structure to the second fixed structure. Additionally, the vibration isolation system includes an isolator, including a shape memory alloy material, associated with the connector. The isolator is arranged between the first fixed structure and the second fixed structure such that the isolator reduces vibrations transferred between the first fixed structure and the second fixed structure.

The vibration isolation system may generally reduce the vibration, loads, and/or motion transferred between the first and second fixed structures at least partially utilizing the shape memory alloy material. As such, the system may reduce engine vibration related noise or rumble associated with the gas turbine engine as well as the vibration transferred to various components of the gas turbine engine and/or the aircraft, allowing quieter operating conditions as well as potentially extending the service life of the gas turbine engine and/or the components thereof. Further, the vibration isolation system may improve the ability of the gas turbine engine, associated components, and/or the aircraft to withstand shock loading. Furthermore, by utilizing a shape memory alloy material within the vibration isolation system, a desirable stiffness and/or damping of the vibration isolation system may be achieved via material choice, cold working, and/or prestraining of the shape memory alloy material. A vibration isolation system may also generally reduce field failures (as compared to unpredictable rubber isolators) and lead to a more compact design, reduced weight benefits, and/or, improve engine efficiency.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extending perpendicular from the centerline 12. Further, a circumferential direction C (shown in/out of the page in FIG. 1) extends perpendicular to both the centerline 12 and the radial direction R. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Additionally, as shown in FIG. 1, the fan section 16 of the gas turbine engine 10 generally includes a rotatable, axial-flow fan rotor 38 configured to be surrounded by an annular nacelle 40. In particular embodiments, the LP shaft 34 may be connected directly to the fan rotor 38 or a rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk 39 may be enclosed or formed as part of a fan hub 41.

It should be appreciated by those of ordinary skill in the art that the nacelle 40 may be configured to be supported relative to the core engine 14 by a plurality of substantially radially-extending, circumferentially-spaced outlet guide vanes 42. As such, the nacelle 40 may enclose the fan rotor 38 and its corresponding fan rotor blades (fan blades 44). Further, as shown, each of the fan blades 44 may extend between a root and a tip in the radial direction R relative to the centerline 12. Moreover, a downstream section 46 of the nacelle 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the nacelle 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 2:
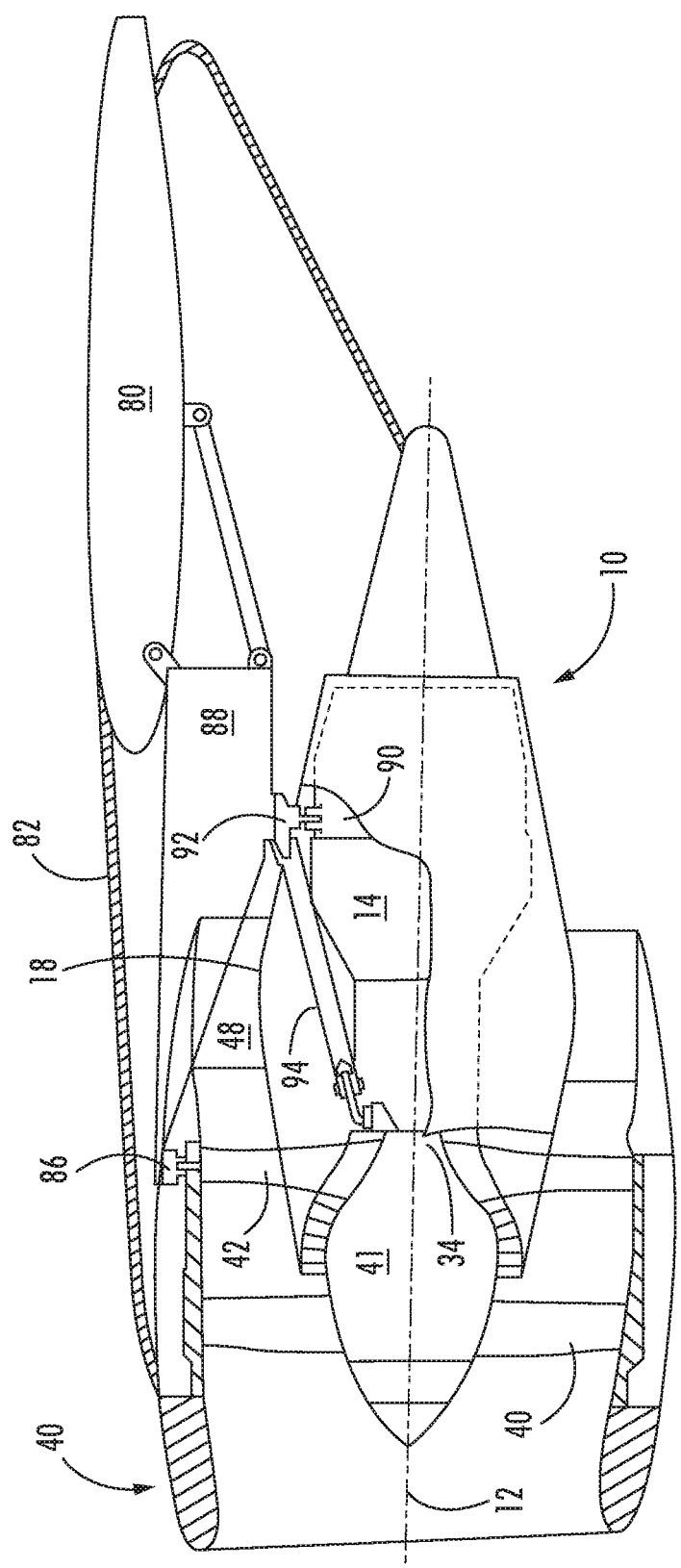
FIG. 2 illustrates a cross-sectional view of the gas turbine engine of FIG. 1 and an associated mounting structure in accordance with aspects of the present subject matter, particularly illustrating the gas turbine engine supported by the mounting structure relative to a wing.
Figure 3:
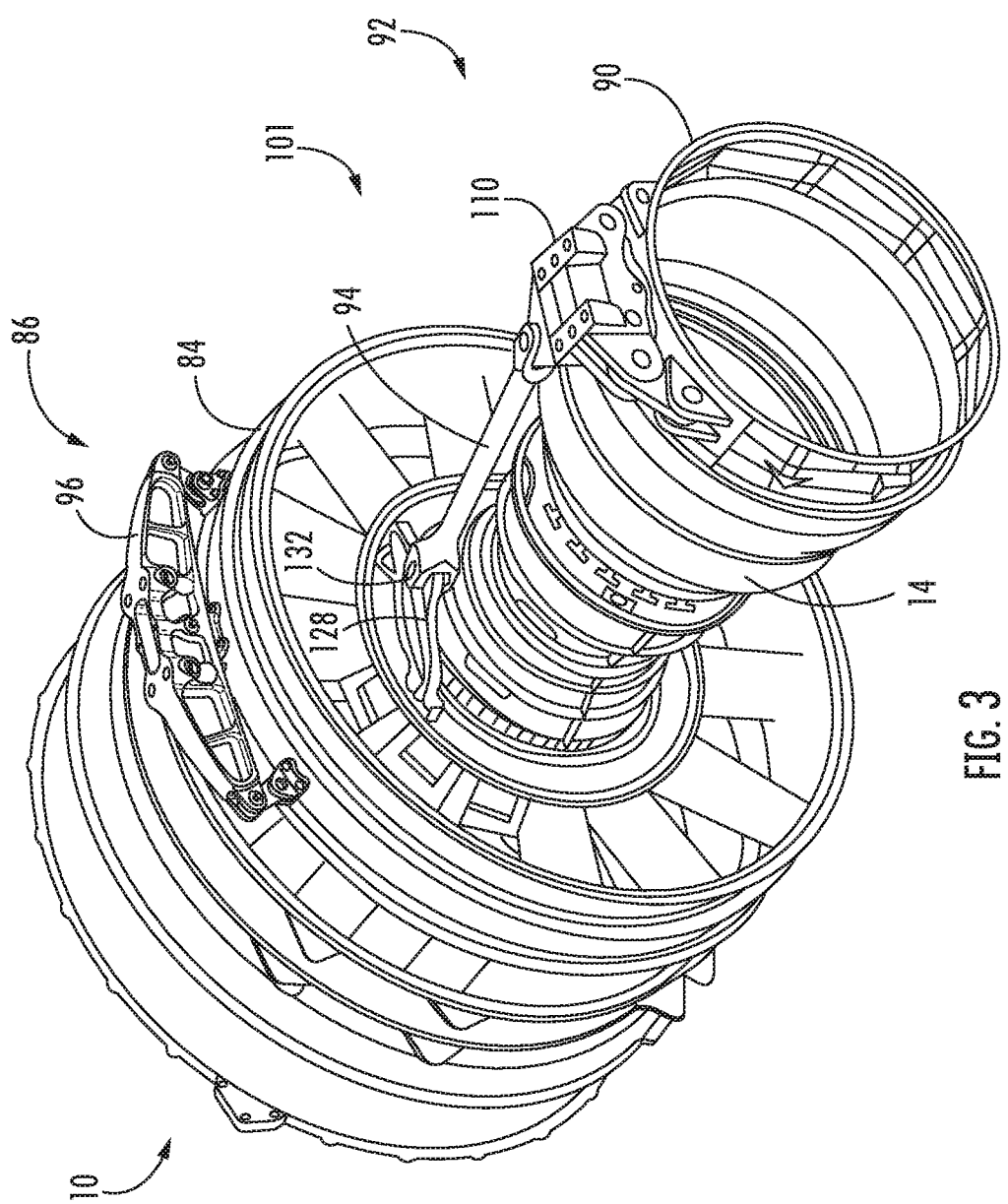
FIG. 3 illustrates a perspective view of the gas turbine engine and mounting structure of FIG. 2 in accordance with aspects of the present subject matter.

Referring now particularly to FIGS. 2 and 3, there is shown the gas turbine engine 10 and an exemplary, associated mounting structure for mounting the engine to an aircraft wing 80 in a typical under-wing engine mounting arrangement such that aircraft wing 80 shown in FIG. 2 carries gas turbine engine 10. For instance, gas turbine engine 10 may be supported from wing 80 by an engine support structure that is enclosed within an aerodynamically-shaped pylon 82 carried by wing 80. Though an exemplary mounting structure is illustrated in reference to FIGS. 2 and 3, it should be appreciated that the present subject matter may be equally applicable to any suitable mounting structure for a gas turbine engine.

Nacelle 40 is connected with and supported from an annular fan frame member 84 (FIG. 2) that is also connected with core engine 14, such as by outlet guide vanes 42. Fan frame member 84 carries a forward engine mount 86 to connect the forward part of gas turbine engine 10 with an engine support structure 88 carried by pylon 82. Engine casing 18 includes as an element an annular aft support frame 90 that is positioned adjacent the core engine turbine and can be in the form of a turbine frame. Aft support frame 90 carries a rear engine mount 92 to connect a downstream portion of core engine 14 with engine support structure 88. Extending forwardly from rear engine mount 92 is a thrust link 94 that interconnects rear engine mount 92 with fan frame member 84 for transmitting engine thrust loads to the aircraft through engine support structure 88 and wing 80 to propel the aircraft in a forward direction, and also to transmit reverse thrust to the aircraft for braking purposes during landing.

Figure 4:
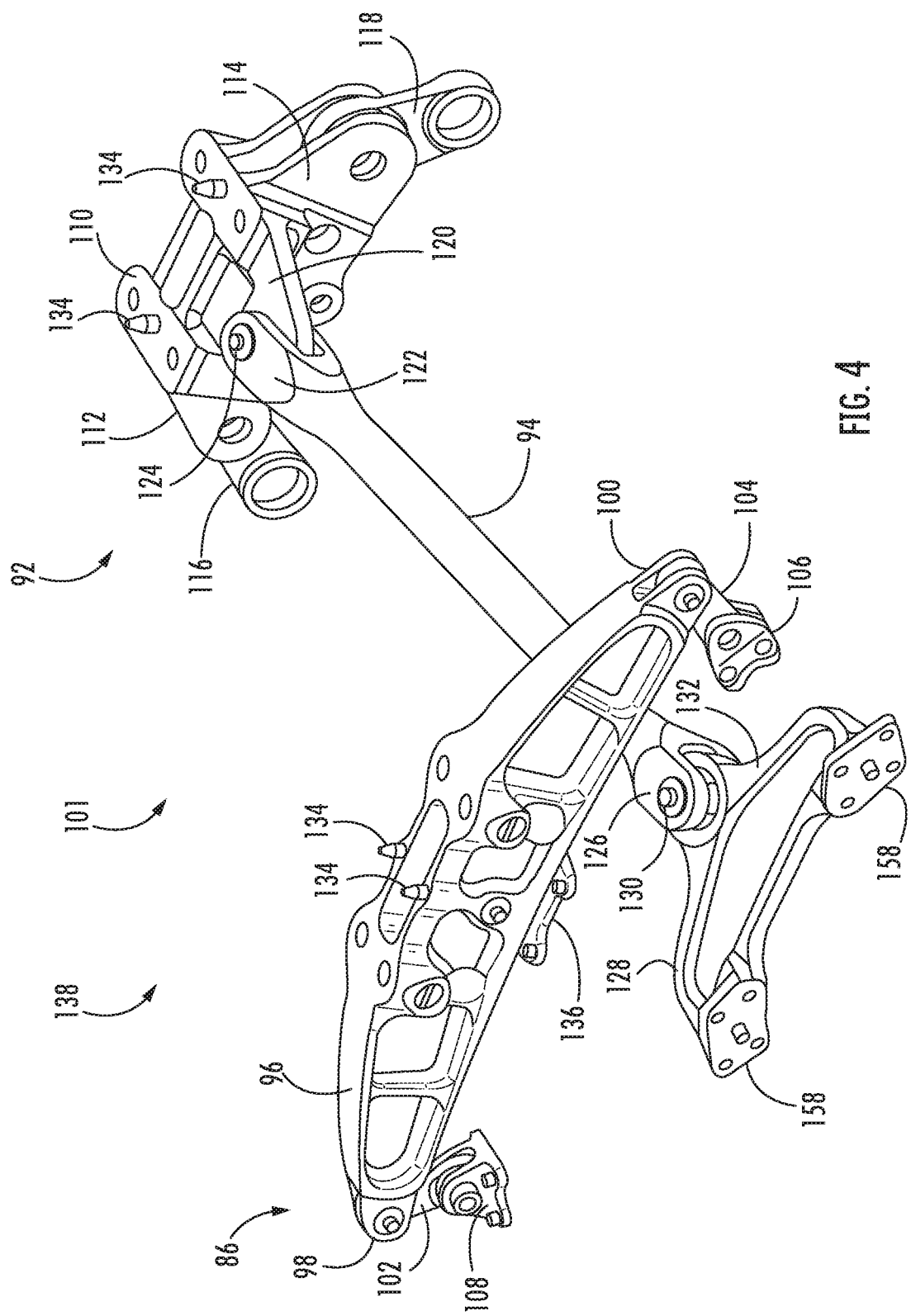
FIG. 4 illustrates a perspective view of the mounting structure of FIGS. 2 and 3 in accordance with aspects of the present subject matter.

Referring now to FIGS. 3 and 4 an exemplary engine mount structure 101 coupling the gas turbine engine 10 to the engine support structure 88 (FIG. 2) is illustrated in accordance with aspects of the present subject matter. As shown, forward engine mount 86 includes a front mount member 96 that is shown as an arc-shaped member that extends in a transverse direction relative to engine longitudinal axis 12. The outer ends 98, 100 of front mount member 96 are connected with fan frame member 84 by a pair of forward mount links 102, 104, respectively, that are each pivotably connected with the ends of front mount member 96, and are also pivotably connected with respective circumferentially-spaced devices 106, 108 carried on the outer periphery of fan frame member 84 by respective pivot pins. The combination of front mount member 96, mount links 102, 104, and fan frame member 84 define a four-bar linkage arrangement.

Rear engine mount 92 includes a rear mount member 110 that is also a generally arc-shaped element, similar to the overall shape of front mount member 96. Rear mount member 110 carries at respective outer ends 112, 114 a pair of laterally-spaced links 116, 118 that each extend outwardly in opposite lateral directions relative to engine longitudinal axis 12. Extending generally axially relative to the engine longitudinal axis 12 and in a forward direction from rear mount member 110 is thrust link tab 120 (see FIG. 4). Thrust link 94 is pivotably connected to thrust link tab 120 by means of a clevis 122 carried at the aft end of thrust link 94, to allow pivoting movement of thrust link 94 in a transverse direction, and about a generally radially-extending pivot axis relative to the engine longitudinal axis 12 and defined by pivot pin 124. The forward end of thrust link 94 includes a clevis 126 that is connected to a fan frame yoke 128 by a pivot pin 130 that passes through a yoke tab 132, to allow relative pivoting movement between thrust link 94 and fan frame yoke 128 about a generally radially-extending pivot axis defined by pivot pin 130. Platforms 158 of the fan frame yoke 28 may be connected to an additional fan frame coupled to tubular outer casing 18. In an additional or alternative embodiment, fan frame yoke 28 may be directly coupled to the outer casing 18 or any intermediate structure coupled to the outer casing 18, e.g., a forward support frame that is adjacent to the core engine turbine and may take the form of a compressor frame.

Each of front mount member 96 and rear mount member 110 may include locating pins 134 to facilitate accurately positioning the respective mounts with respect to the associated parts of the airframe, and also to prevent pivoting movement of those mount members relative to the airframe structure. Each of the mount members is securely connected to the airframe structure by suitable connecting bolts (not shown), or the like. The engine mounting system may further include forward fail-safe clevis lug (forward lug 136), see FIG. 4, to couple the fan frame member 84 to the engine support structure 88. For instance, forward lug 136 may be received within a slot formed in front mount member 96 that defines a front fail-safe clevis.

Figure 5:
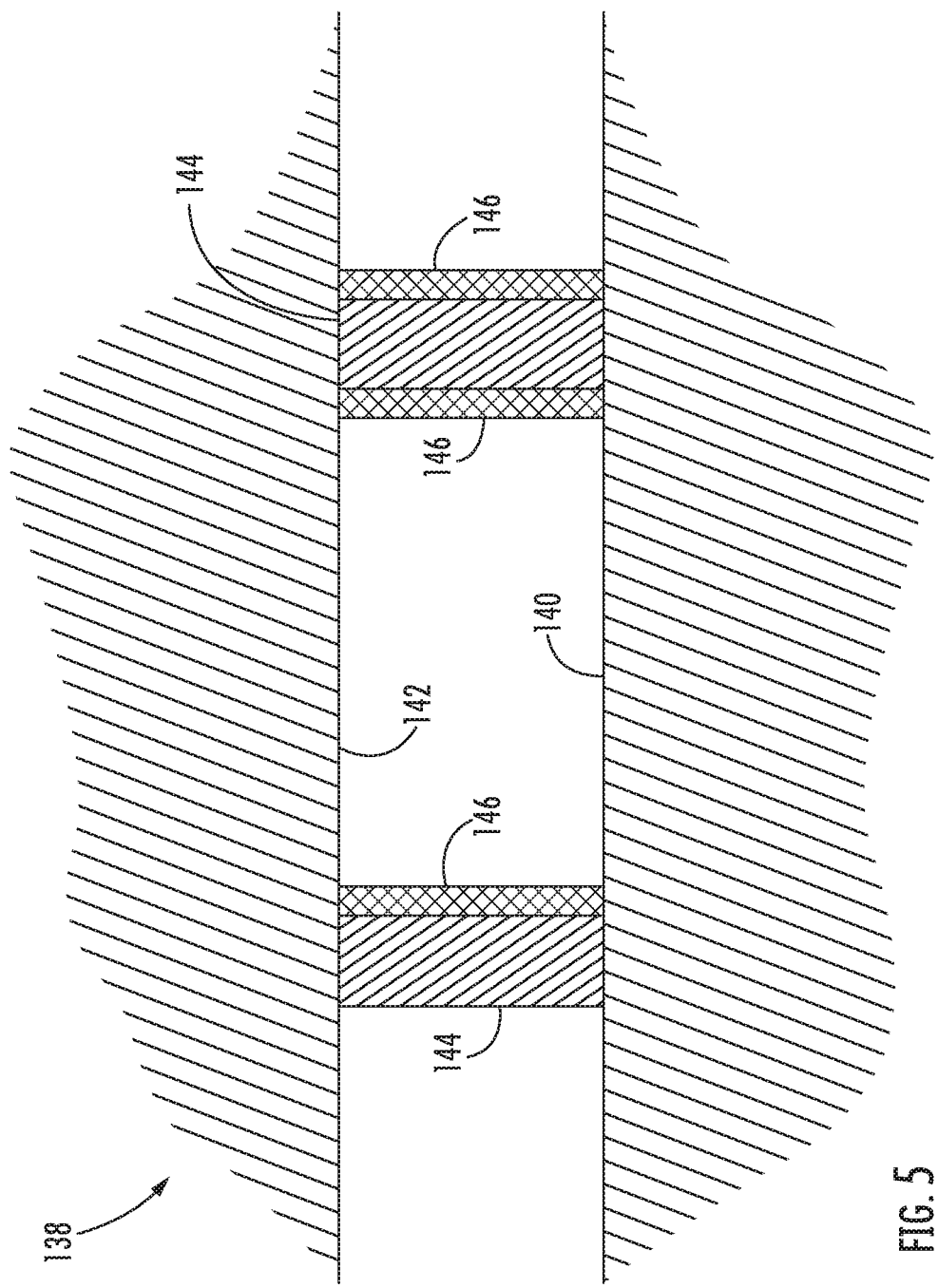
FIG. 5 illustrates a schematic view of a vibration isolation system for a gas turbine engine in accordance with aspects of the present subject matter.

Referring now to FIG. 5, an exemplary embodiment of a vibration isolation system 138 for a gas turbine engine is illustrated in accordance with aspects of the present subject matter. For instance, the system 138 may be utilized in association with the gas turbine engine 10, the engine mount structure 101, and/or the engine support structure 88 as described generally in reference to FIGS. 1-4 or any other suitable gas turbine engine, engine mount structure, and/or engine support structure.

The vibration isolation system 138 may include a first fixed structure 140 of the gas turbine engine 10. For example, the first fixed structure 140 may include a fixed frame of the gas turbine engine 10. More particularly, in certain embodiments, the first fixed structure 140 may include one or more of the nacelle 40, outlet guide vanes 42, outer casing 18, annular frame member 84, aft support frame 90, and/or any other suitable rigid component of the gas turbine engine 10.

The vibration isolation system 138 may further include a second fixed structure 142 separate from the first fixed structure 140. Generally, as described below in reference to FIGS. 4 and 6-11, the second fixed structure 142 may be the engine mount structure 101. As such, the isolation system 138 may at least partially isolate the first fixed structure 140 of the gas turbine engine 10 and the engine mount structure 101. However, in additional or alternative embodiments, the second fixed structure 142 may include the engine support structure 88, the pylon 82, the wing 80, and/or any other suitable structure configured to mount the gas turbine engine 10 to an associated aircraft such that the isolation system 138 at least partially isolates the first fixed structure 140 of the gas turbine engine 10 from the aircraft. In another embodiment, as described below particularly in reference to FIGS. 12-20, the second fixed structure 142 may include an engine component associated with the gas turbine engine 10. For instance, the second fixed structure 142 may include an engine component coupled to the gas turbine engine 10 such that the isolation system 138 at least partially isolates the first fixed structure 140 of the gas turbine engine 10 from the engine component.

The vibration isolation system 138 may generally reduce the vibration, loads, and/or motion transferred between the first and second fixed structures 140, 142 at least partially utilizing a shape memory alloy material. As such, the system 138 may reduce engine vibration related noise or rumble associated with the gas turbine engine 10 as well as the vibration transferred to various components of the gas turbine engine 10 and/or the aircraft, allowing quieter operating conditions as well as potentially extending the service life of the gas turbine engine 10 and/or the components thereof. Further, the vibration isolation system 138 may improve the ability of the gas turbine engine 10, associated components, and/or the aircraft to withstand shock loading. Furthermore, by utilizing a shape memory alloy material within the vibration isolation system 138, a desirable stiffness and/or damping of the vibration isolation system 138 may be achieved via material choice, cold working, and/or prestraining of the shape memory alloy material. A vibration isolation system 138 may also generally reduce field failures (as compared to unpredictable rubber isolators) and lead to a more compact design, reduced weight benefits, and/or, improve engine efficiency.

As shown in FIG. 5, the vibration isolation system 138 may include one or more connectors 144 coupling the first fixed structure 140 and the second fixed structure 142. For instance, the connector(s) 144 may include one or more fasteners such as bolts, pins, screws, rivets, links, or any other suitable structure for coupling the first and second fixed structures 140, 142 together. Furthermore, the vibration isolation system 138 may include one or more isolators 146 associated with one or more of the connectors 144. The isolator(s) 146 may be arranged between the first fixed structure 140 and the second fixed structure 142 such that the isolator(s) 146 reduces vibrations transferred therebetween.

For example, the vibration isolation system 138 may include an isolator 146 associated with each of the connectors 144. Additionally, one or more connectors 144 may be associated with multiple isolators 146. For instance, one or more connectors 144 may include the isolator(s) 146. It should be appreciated that an isolator 146 may be coupled or otherwise formed with one or more isolators 146. In additional or alternative embodiments, the connector(s) 144 and isolator(s) 146 may be integrally formed together as a monolithic component. Additionally, at least one isolator includes a shape memory alloy (SMA) material.

In various embodiments, as described in reference to FIGS. 6-20, the isolator(s) 146 may include links, tabs, coatings, washers, or sleeves associated with the connector(s) 144. However, though certain connectors 144 and isolators 146 are illustrated in reference to certain embodiments in FIGS. 6-20, it should be appreciated that any suitable connector 144 and any suitable isolator 146 may be arranged between the first fixed structure 140 and the second fixed structure 142. For instance, various connectors 144 and associated isolators 146 coupling the gas turbine engine 10 to the engine mount structure 101 may be utilized to couple gas turbine engine components to the gas turbine engine 10 and isolate such components, and vice-versa.

In general, vibrations and loads acting through the shape memory alloy isolator(s) 146 may cause bending and/or deflections of the isolator(s) 146. As such, the bending and/or deflections of the isolator(s) 146 may dampen vibrations and/or loads acting through the isolator(s) 146 and thus dampen vibrations and/or loads transferred between the first and second fixed structures 140, 142.

Still referring to the exemplary embodiment of FIG. 5, one or more of the isolators 146 may include a shape memory alloy (SMA) material. In an additional or alternative embodiment, each of the isolators 146 may include the SMA material. In some embodiments, the isolator(s) 146 may include the SMA material as a major constituent, in an amount greater than 50 wt. % of the isolator(s) 146. In certain embodiments, the isolator(s) 146 may be essentially composed of the SMA material. A SMA material is generally an alloy capable of returning to its original shape after being deformed. Further, SMA materials may act as a lightweight, solid-state alternative to traditional actuators. For instance, certain SMA materials may be heated in order to return a deformed SMA to its pre-deformed shape. A SMA material may also provide varying stiffness, in a pre-determined manner, in response to certain ranges of temperatures. The change in stiffness of the shape memory alloy is due to a temperature related, solid state micro-structural phase change that enables the alloy to change from one physical shape to another physical shape. The changes in stiffness of the SMA material may be developed by working and annealing a preform of the alloy at or above a temperature at which the solid state micro-structural phase change of the shape memory alloy occurs. The temperature at which such phase change occurs is generally referred to as the critical temperature or transition temperature of the alloy. In the manufacture of the SMA isolator(s) 146 intended to change stiffness during operation of the gas turbine engine 10, the isolator(s) 146 may be formed to have one operative stiffness (e.g., a first stiffness) below a transition temperature and have another stiffness (e.g., a second stiffness) at or above the transition temperature.

Some shape memory alloys used herein are characterized by a temperature-dependent phase change. These phases include a martensite phase and an austenite phase. The martensite phase generally refers to a lower temperature phase whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase, is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, the SMA isolator(s) 146 may define a first stiffness at a first temperature and define a second stiffness at a second temperature, wherein the second temperature is different from the first temperature. Further, in some embodiments, one of the first temperature and the second temperature is below the transition temperature and the other one may be at or above the transition temperature. Thus, in some embodiments, the first temperature may be below the transition temperature and the second temperature may be at or above the transition temperature, while in some other embodiments, the first temperature may be at or above the transition temperature and the second temperature may be below the transition temperature.

Exemplary, but non-limiting examples of SMAs that may be suitable for forming the SMA isolator(s) 146 may include nickel-titanium (NiTi) and other nickel-titanium based alloys such as nickel-titanium hydrogen fluoride (NiTiHf) and nickel-titanium palladium (NiTiPd). However, it should be appreciated that other SMA materials may be equally applicable to the current disclosure. For instance, in certain embodiments, the SMA may include a nickel-aluminum based alloys, copper-aluminum-nickel alloy, or alloys containing zinc, copper, gold, and/or iron. The alloy composition may be selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys may change from austenite to martensite upon cooling.

Moreover, SMA materials may also display superelasticity. Superelasticity may generally be characterized by recovery of large strains, potentially with some dissipation. For instance, martensite and austenite phases of the SMA material may respond to mechanical stress as well as temperature induced phase transformations. For example, SMAs may be loaded in an austenite phase (i.e. above a certain temperature). As such, the material may begin to transform into the (twinned) martensite phase when a critical stress is reached. Upon continued loading and assuming isothermal conditions, the (twinned) martensite may begin to detwin, allowing the material to undergo plastic deformation. If the unloading happens before plasticity, the martensite may generally transform back to austenite, and the material may recover its original shape by developing a hysteresis.

In some embodiments, the SMA isolator(s) 146 may be in a pre-strained or pre-stressed condition. The isolator(s) 146 in the pre-stressed condition may shift the hysteresis cycle of the isolator(s) 146 to a range of stresses that is different from that of a non-pre-stressed isolator(s) 146. The pre-stressing further serves to maximize the damping function of the SMA isolator(s) 146 so that the material is active at the maximum stresses generated. More particularly, placing the isolator(s) 146 in a pre-stressed condition may allow for isolator(s) 146 to enter a hysteretic bending regime, without requiring a relatively large amount of displacement. For instance in certain embodiments, the isolator(s) 146 may be pre-stressed between 70 GPa and 150 GPa. Additionally, the isolator(s) 146 may be prestressed during the assembly of the first and second fixed structures 140, 142. For instance, the connector(s) 144 may couple the first and second fixed structures 140, 142 while also prestressing the isolator(s) 146. In an exemplary embodiment, the connector(s) 144 may be a bolt that is twisted until a desired amount of prestress is applied to the isolator(s) 146 arranged between the first and second fixed structures 140, 142. In an additional or alternative embodiment, the isolator(s) 146 may be prestressed and then coupled to the connector(s) 144, which is then coupled between the first and second fixed structures 140, 142.

Referring again to FIG. 4, the vibration isolation system 138 may include one or more components of the engine mount structure 101. For instance, the second fixed structure 142 may include one or more components of the engine mount structure 101, such as the forward engine mount 86, the rear engine mount 92, and/or the fan frame yoke 128. As described above, the engine mount structure 101 may include several attachment structures (e.g., connectors 144) for coupling the engine mount structure 101 to the first fixed structure 140 (e.g., the fixed frame of the gas turbine engine 10). Further, an isolator 146 may be associated with one or more of the connectors 144, such as all of the connectors 144, and arranged between the fixed frame and the engine mount structure 101 to reduce vibrations and/or loads transferred between the gas turbine engine 10 and the aircraft. As described generally below in reference to FIGS. 7-11, the isolator(s) 146 may include one or more links, tabs, or sleeves. Additionally, one or more of the isolators 146, such as all of the isolators 146, may include one or more SMA materials.

Referring now particularly to FIGS. 4, 6, and 7, various embodiments of the connector(s) 144 and isolator(s) 146 together forming links are illustrated in accordance with aspects of the present subject matter. For instance, the second fixed structure 142 may include the rear mount member 110 and/or the front mount member 96. In such an embodiment, one or more connectors 144 and isolators 146 may together form one or more of the links 116, 118, 102, 104. As shown particularly in FIG. 6, the link(s) 116, 118, 102, 104 may be configured as a monolithic link 148. In such an embodiment, the monolithic link 148 may act as the connector 144 while also including the SMA material such that the monolithic link 148 may reduce vibrations and/or loads transferred between the fixed frame of the gas turbine engine 10 and the engine mount structure 101.

As shown in FIG. 7, in an additional or alternative embodiment, the link(s) 116, 118, 102, 104 may be configured as a segmented link 150. As shown, the segmented link 150 may include a first segment 152 and a second segment 154. In one exemplary embodiment, the segmented link 150 may further include a third segment 156. The segments 152, 154, 156 may be coupled together, integrally formed together, or held together via friction. Moreover, one or more of the segments 152, 154, 156 may include a SMA material and be configured as the isolator 146. In another embodiment, all three of the segments 152, 154, 156 may include the same or different SMA materials and thus may be configured as both the isolator 146 and the connector 144. In an additional embodiment, one of the segments 152, 154, 156 may include a different material (e.g., a metal or composite) and be configured as the connector 144 while the other segment(s) 150, 152, 156 includes one or more SMA materials and is configured as the isolator 146. For instance, in the illustrated embodiment of FIG. 7, the segments 152, 154, 156 may each include one or more SMA materials and acts as isolators 146 sandwiching the segment 154 including a different material acting as the connector 144.

Referring now to FIGS. 4 and 8, multiple views of the connector 144 including a platform 158 and the isolator 146 including a tab 160 are illustrated in accordance with aspects of the present subject matter. More particularly, the connector 144 may include the platform 158 as well as a fastener, such as a bolt or pin (not shown), to couple the platform 158 to the first fixed structure 140. In the illustrated embodiment, the second fixed structure 142 may include the fan frame yoke 128 of the engine mount structure 101, and the first fixed structure 140 may include the fixed frame of the gas turbine engine 10. Moreover, one or more tabs 160 including one or more SMA materials may be arranged between the platform 158 and the fixed frame of the gas turbine engine 10 such that the tab(s) 160 reduces vibrations and/or loads transferred between the fixed frame and the engine mount structure 101. In certain embodiments, as illustrated in regard to FIG. 8, the platform 158 may define one or more cutaways 162. Such cutaway(s) 162 may allow flexibility within the platform 158 and/or system 138 and thus further reduce vibrations and/or loads transferred between the first and second fixed structures 140, 142.

Referring now particularly to FIGS. 4 and 9, one embodiment of the connector(s) 144 configured as a bolt or pin (bolt 164) and the isolator(s) 146 configured as a sleeve 166 is illustrated in accordance with aspects of the present subject matter. Particularly, in as shown in FIG. 9, the second fixed structure 142 may include the front mount member 96 of the engine mount structure 101, and the first fixed structure 140 may include the fixed frame of the gas turbine engine 10, such as the annular frame member 84. In the illustrated embodiment, the bolt(s) 164 couples the front mount member 96 to the annular frame member 84, and the isolator(s) 146 is arranged therebetween. Further, the sleeve(s) 166 may include one or more SMA materials such that the sleeve(s) 166 reduces vibrations and/or loads transferred between the fixed frame and the engine mount structure 101. However, it should be appreciated that the bolt(s) 164 and sleeve(s) 164 may be utilized to couple and at least partially isolate any two fixed structures 140, 142.

Figure 10:
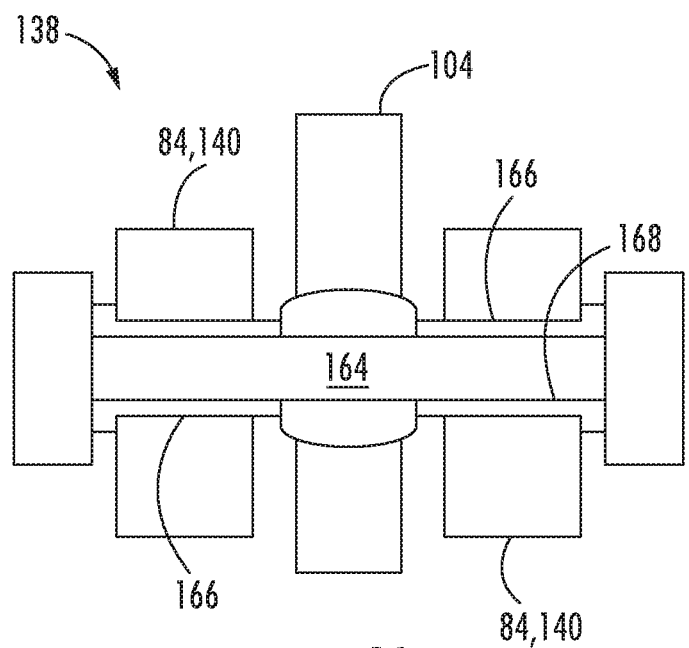
FIG. 10 illustrates a schematic view of one embodiment of a connector and isolator of FIG. 9, particularly illustrating the connector configured as a bolt and the isolator including the SMA material configured as a sleeve.

Referring now to FIG. 10, a cross-section of the bolt 164 and sleeve 166 taken along the section line 10-10 of FIG. 9 is illustrated schematically in accordance with aspects of the present subject matter. As shown, the sleeve 166, including one or more SMA materials, may be arranged along an exterior surface 168 of the bolt 164. Further, as shown, the vibration isolation system 138 may include multiple sleeves 166 arranged along the exterior surface 168 of the bolt 164. In such an embodiment, one or more of the sleeves 166 may include the SMA material, such as all of the sleeves 166. However, in another embodiment each sleeve 166 may include a different SMA material, or one sleeve 166 may include a SMA material with another sleeve 166 includes a different material (such as a polymer, elastomer, rubber, or the like). In an additional or alternative embodiment, the sleeve(s) 166 may be coupled to or integrally formed with the bolt 164.

Figure 11:
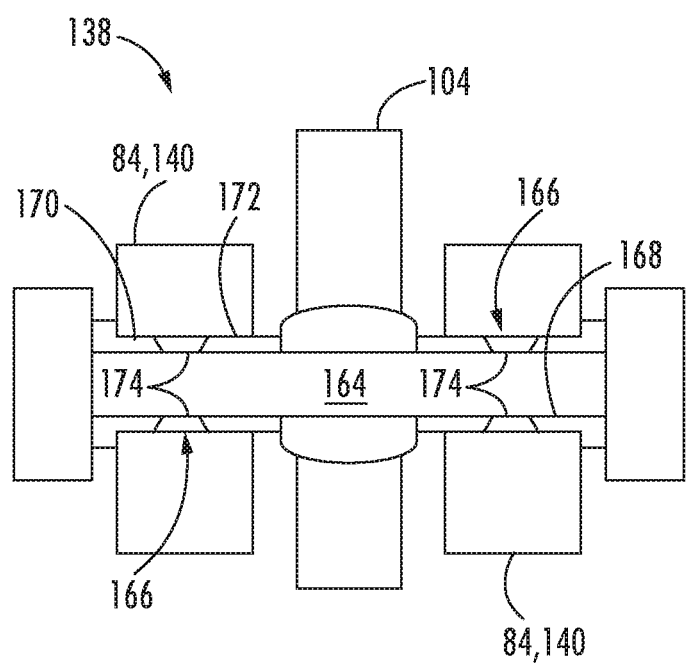
FIG. 11 illustrates a schematic view of an alternative embodiment of the connector and isolator of FIG. 9, particularly illustrating the isolator including the SMA material configured as a split sleeve.

Referring now to FIG. 11, a cross-section of an alternative bolt 164 and sleeve 166 arrangement is illustrated in accordance with aspects of the present subject matter. More particularly, FIG. 11 illustrates the sleeve 166 configured as a split sleeve. In such an embodiment, the sleeve(s) 166 may include a first segment 170 and a second segment 172, at least one of which includes the SMA material. For instance, both segments 170, 172 may include the same or different SMA materials. Additionally, as shown, the sleeve 166 may include one or more wedges 174 arranged between the segments 170, 172 of the sleeve 166. In one embodiment, the wedge(s) 174 may include an SMA material, for instance the same SMA material as one or both of the segments 170, 172 or a different SMA material. In another embodiment, one of the segments 170, 172 and/or the wedge(s) 174 may include a different material, such as a polymer, elastomer, rubber, composite, metal, or the like. It should be appreciated that the segments 170, 172 and/or wedges 174 may be coupled together or formed integrally together. However, in other embodiments, each of the segments 170, 172 and/or wedges 174 may be separate components. For example, the segment 170, 172 may be separate adjacent sleeves 166.

Referring now FIG. 12, an alternative embodiment of the vibration isolation system 138 is illustrated in accordance with aspects of the present subject matter. Particularly, FIG. 12 illustrates the system 138 where the second fixed structure 142 is configured as an engine component 176. As shown, the engine component 176 may include several attachment structures (e.g., connectors 144) for coupling the engine component 176 to the first fixed structure 140 (e.g., the fixed frame of the gas turbine engine 10). Further, an isolator 146 may be associated with one or more of the connectors 144, such as all of the connectors 144, and arranged between the fixed frame and the engine component 176 to reduce vibrations and/or loads transferred between the gas turbine engine 10 and the engine component 176. As described generally below in reference to FIGS. 13-20, the isolator(s) 146 may include one or more washers, stacked elements, or coatings as well as any of the suitable isolators 146 as described in reference to FIGS. 4 and 6-11. Additionally, one or more of the isolators 146, such as all of the isolators 146, may include one or more SMA materials. For example, the SMA material may be a component of the isolator(s) 146, or the isolator(s) 146 may be formed entirely or approximately entirely of the one or more SMA materials.

Figure 14:
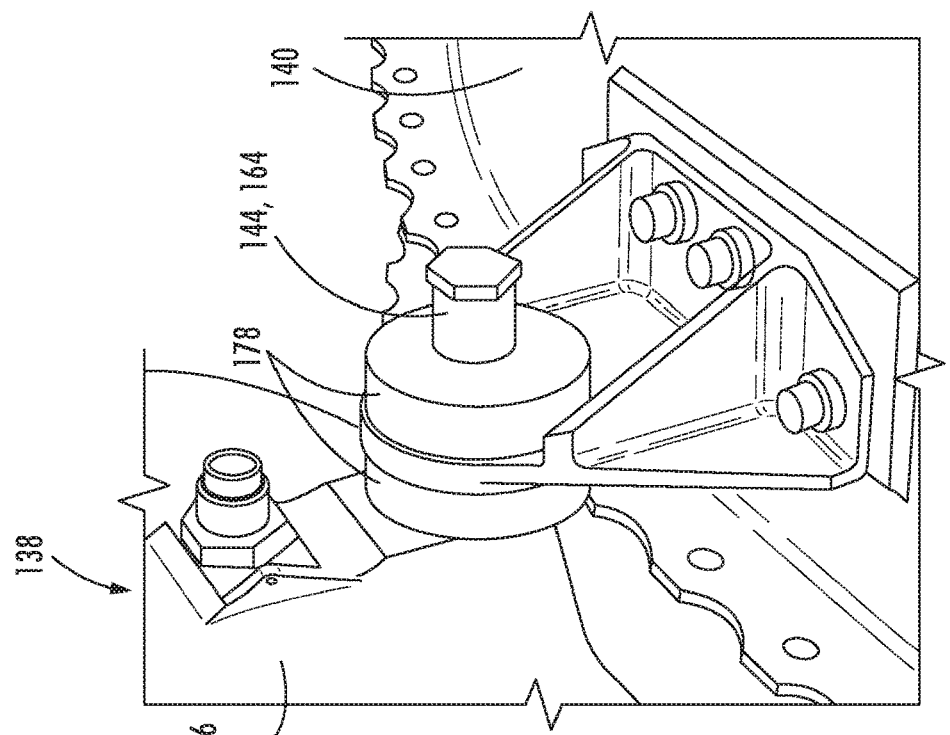
FIG. 14 illustrates a perspective view of alternative embodiments of a connector and isolators that may be utilized in the vibration isolation system of FIG. 12 in accordance with aspects of the present subject matter.
Figure 13:
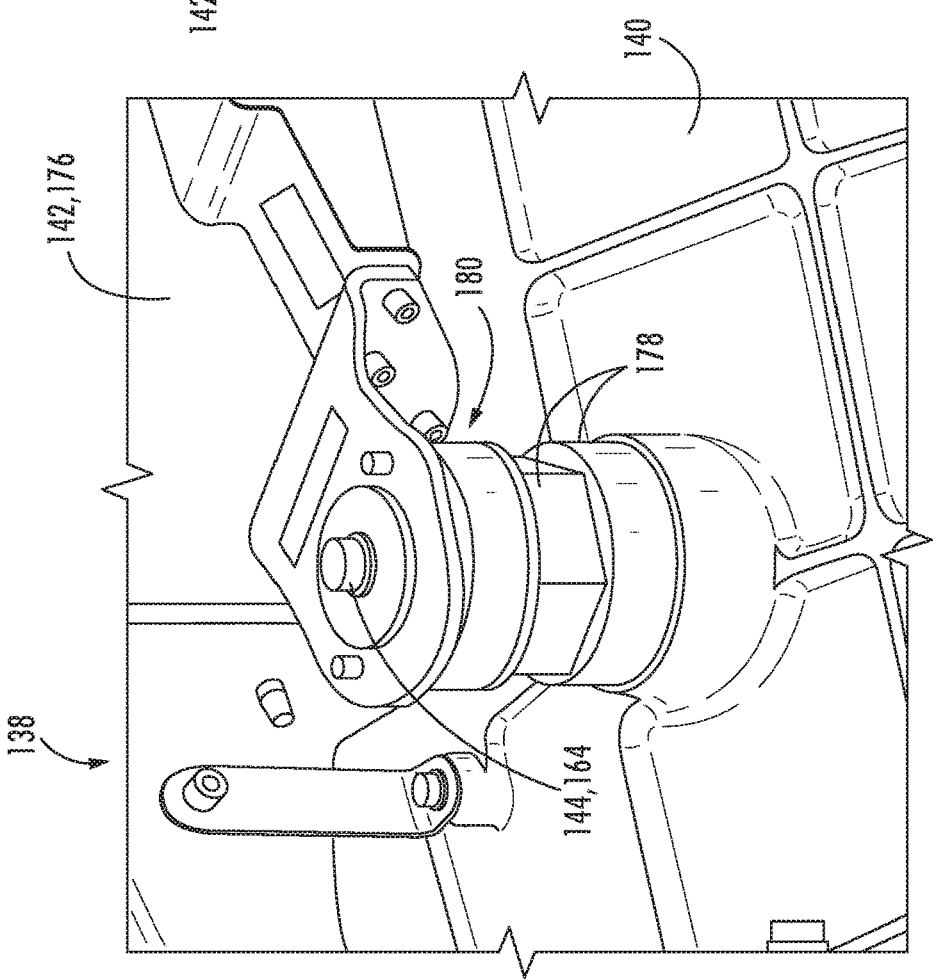
FIG. 13 illustrates a perspective view of one embodiments of a connector and isolators that may be utilized in the vibration isolation system of FIG. 12 in accordance with aspects of the present subject matter.

Referring now to FIGS. 13 and 14, multiple views of embodiments of the vibration isolation system 138 are illustrated in accordance with aspects of the present subject matter. Particularly, FIGS. 13 and 14 illustrating different embodiments of connectors 144 and isolators 146 suitable for use in the vibration isolations system 138. As shown, the connector(s) 144 may be configured as a bolt 164. Furthermore, the isolator(s) 146 may include one or more washers 178 arranged between the engine component 176 and the fixed frame. Though described in reference to the engine component 176, it should be appreciated that the isolator(s) 146 configured as washers 178 may generally be arranged between any first fixed structure 140 and second fixed structure 142 as described herein. In certain embodiments, as shown particularly in regard to FIG. 13, the isolator(s) 178 may include two or more stacked elements 180 arranged between the fixed frame and the engine component 176. Though described in reference to the engine component 176, it should be appreciated that the isolator(s) 146 configured as the stacked elements 180 may generally be arranged between any first fixed structure 140 and second fixed structure 142 as described herein. Additionally, the stacked elements 180 may generally include any of the isolators 146 described herein. Furthermore, the stacked elements 180 may define voids or spaces (not shown) between adjacent stacked elements 180, between stacked elements 180 and the first fixed structure 140, and/or between the stacked elements 180 and the second fixed structure 142. It should be appreciated that such voids or spaces may increase the amount the stacked elements 180 may bend or defect, and thus the degree the stacked elements reduce vibrations and/or loads transferred between the fixed frame of the gas turbine engine 10 and the engine component 176. Further, when a sufficient load is applied through the connector(s) 144 and isolator(s) 146 to close the voids or spaces, the degree the stacked elements 180 may bend or defect may be reduced and thus the stiffness of the isolator(s) 146 may be increased providing a more rigid damping.

Figure 15:
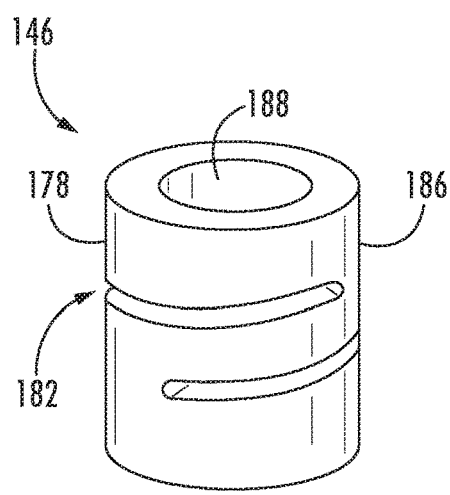
FIG. 15 illustrates an isolator including an SMA material in accordance with aspects of the present subject matter, particularly illustrating the isolator configured as a washer defining a slot.
Figure 16:
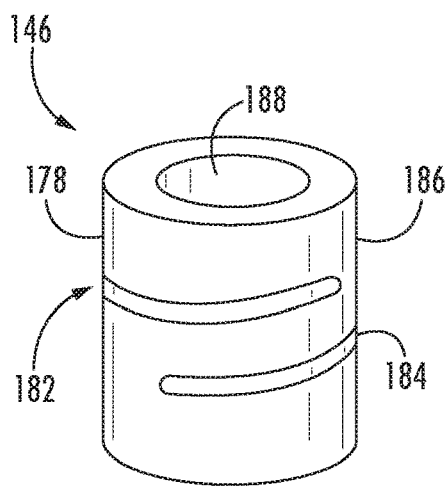
FIG. 16 illustrates an isolator including an SMA material in accordance with aspects of the present subject matter, particularly illustrating the isolator configured as a washer and including an insert within the slot.

Referring now to FIGS. 15 and 16, embodiments of the washer 178 are illustrated in accordance with aspects of the present subject matter. Particularly, FIG. 15 illustrates a washer 178 defining a slot 182, and FIG. 16 illustrates the washer 178 including an insert 184 within the slot 182. As illustrated, the washer 178 may define one or more slots 182 recessed within the washer 178. For example, the slot 182 may be recessed within an outer surface 186. In an additional or alternative embodiment, the slot 182 may be recessed within an inner surface 188 of the washer 178. Further, in one particularly embodiment, the slot 182 may extend fully between the outer surface 186 and the inner surface 188. The slot 182 may generally circumferentially extend along the outer surface 186 and/or the inner surface 188 of the washer 178. For example, as shown the slot 182 may spiral while extending circumferentially along the outer and/or inner surfaces 186, 188 of the washer 178. It should be appreciated that such slot 182 may increase the amount the washer 178 may bend or defect, and thus the degree the washer 178 reduces vibrations and/or loads transferred between the first fixed structure 140 and the second fixed structure 142. Further, when a sufficient load is applied through the washer 178 to close the slot 182, the degree the washer 178 may bend or defect may be reduced and thus the stiffness of the washer 178 may be increased providing a more rigid isolator 146.

Referring particularly to FIG. 16, in one embodiment the isolator 146 may include an insert 184 positioned at least partially within the slot(s) 182. In certain embodiments, the insert 184 may be coupled, integrally coupled, and/or formed integrally with the washer 178. The insert 184 may generally deflect or bend as the slot 182 closes and provide additional load damping and/or vibration isolation to the isolator 146. In certain embodiments, the washer 178 and insert 184 may each include an SMA material, such as the same or different SMA materials. For instance, the washer 178 may include an SMA material with a first stiffness and the insert 184 may include a second SMA material with a second stiffness, for instance a greater stiffness. As such, the isolator 146 may provide a stiffer dampening of vibrations and/or loads when the insert 184 deflects. In certain embodiments, one of the washer 178 or insert 184 may include an SMA material while the other includes a different material (e.g., a rubber, polymer, metal, composite, or the like).

Figure 17:
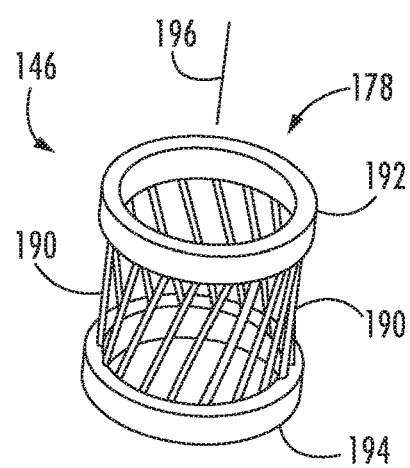
FIG. 17 illustrates an isolator including an SMA material in accordance with aspects of the present subject matter, particularly illustrating the isolator configured as a washer including members extending between rings of the washer.

Referring now to FIGS. 17-20, multiple views of embodiments of the isolator 146 configured as washers 178 are illustrated in accordance with aspects of the present subject matter. More particularly, FIGS. 17-20 illustrate washers 178 including members 190. As shown in the illustrated embodiments, the washer 178 may include a first ring 192 and a second ring 194 separate from the first ring 192. Furthermore, the first ring 192 and second ring 194 may be axially aligned (such as relative to axial axis 196 of the washer 178). As such, a two or more members 190 may extend between the first ring 192 and the second ring 194 to couple the rings 192, 194 together and form the washer 178. One or more of the members 190 (such as all of the members) may be coupled to, integrally coupled to, and/or formed integrally with one or both of the rings 192, 194 Furthermore, at least one of the rings 192, 194 or members 190 may include an SMA material. For example each of the rings 192, 194 and members 190 may include an SMA material (such as the same or different SMA materials). In additional or alternative embodiments, at least one of the rings 192, 194 or members 190 may include a different material. The members 190 may generally extend between the rings 192, 194 at the same or different angles or may be axially aligned with the rings 192. For instance as shown in FIG. 17, each of the members 190 may define the same or approximately the same angle relative to the axial axis 196.

Figure 18:
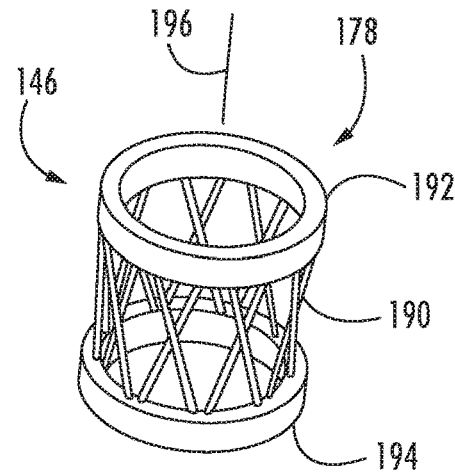
FIG. 18 illustrates an isolator including an SMA material in accordance with aspects of the present subject matter, particularly illustrating the isolator configured as washer including members extending between rings of the washer and defining an "X" pattern.
Figure 19:
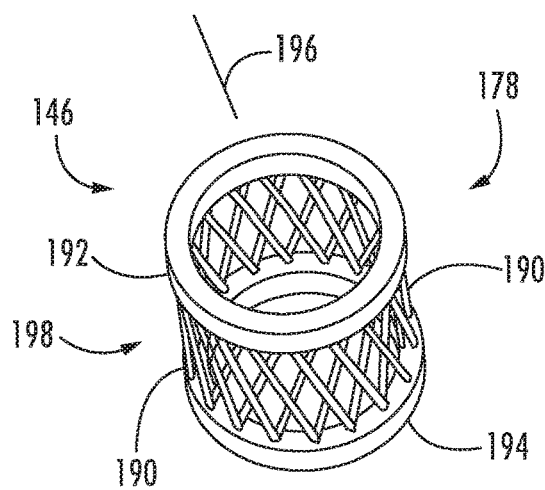
FIG. 19 illustrates an isolator including an SMA material in accordance with aspects of the present subject matter, particularly illustrating the isolator configured as a washer including members extending between rings of the washer to define a mesh extending therebetween.
Figure 20:
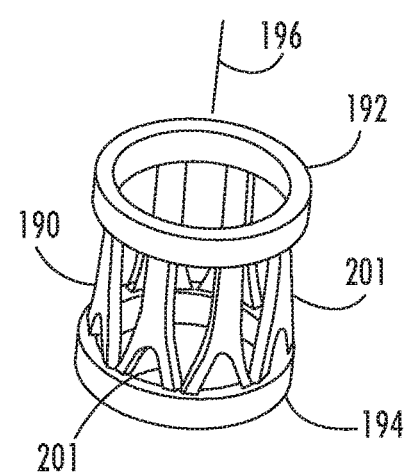
FIG. 20 illustrates an isolator including an SMA material in accordance with aspects of the present subject matter, particularly illustrating the isolator configured as a washer including members including ligaments extending between rings of the washer.

Referring now particularly to FIG. 18, the members 190 may extend between the rings 192, 194 such that the members 190 define one or more "X" patterns. In another embodiment, as shown particularly in reference to FIG. 19, the members 190 may extend between the rings 192, 194 in order to define a mesh 198 extending therebetween. It should be appreciated that the members 190 may extend between the rings 192, 194 in order to define any suitable or desirable orientation or pattern. Additionally, the washer 178 may include members (not shown) extending circumferentially or at least partially circumferentially relative to the axial axis 196 and coupled, integrally coupled, or formed integrally with the members 190 extending between the rings 192, 194. As shown particularly in FIG. 20, in an additional or alternative embodiment, one or more of the members 190 may include ligaments 201 forming the member 190. For example, in the illustrated embodiment, each of the ligaments 201 may be coupled, integrally coupled, or formed integrally with at least one of the rings 192, 194. However, in other embodiments, one or more ligaments 201 may only be coupled, integrally coupled, or formed integrally with other ligaments 201 (and thus not directly contact either ring 192, 194). For instance, one or more ligaments 201 may couple adjacent members 190 or form bumpers between adjacent members 190. For instance, ligaments 201 configured as bumpers may extend circumferentially, or substantially circumferentially, to in order to reduce deflections and/or bending of members 190 in the circumferential direction. As such, when a member 190 begins to bend, such as bow, in the circumferential direction the bumpers may contact bumpers of adjacent members 190 and/or the adjacent members 190 themselves to reduce such circumferential deflections. Furthermore, though the ligaments 201 form "A" shaped cross-sections in the embodiment of FIG. 20, it should be appreciated that the ligaments 201 may define any suitable cross-sectional shape of the members 190.

In additional or alternative embodiments, the isolator(s) 146 may include a coating applied between the first fixed structure 140 and the second fixed structure 142 to reduce vibrations and/or loads transferred between the first fixed structure 140 and the second fixed structure 142. For instance, a coating including one or more SMA materials may be applied to the first fixed structure 140 and/or the connector(s) 144 between the first fixed structure 140 and the connector(s) 144. In additional or alternative embodiments, a coating including one or more SMA materials may be applied to the second fixed structure 142 and/or the connector(s) 144 between the second fixed structure 142 and the connector(s) 144. For instance, in embodiments where the second fixed structure 142 includes an engine component 176, the coating including the SMA material(s) may be applied to an exterior surface of one or more of the fixed frame of the gas turbine engine 10, the engine component 176, and/or connector(s) 144 between the fixed frame and the engine component 176. In an additional or alternative embodiment, a coating including one or more SMA materials may be applied to an exterior surface of one or more of the fixed frame of the gas turbine engine 10, the engine mount structure 101, and/or connector(s) 144 between the fixed frame and the engine mount structure 101.

Figure 21:
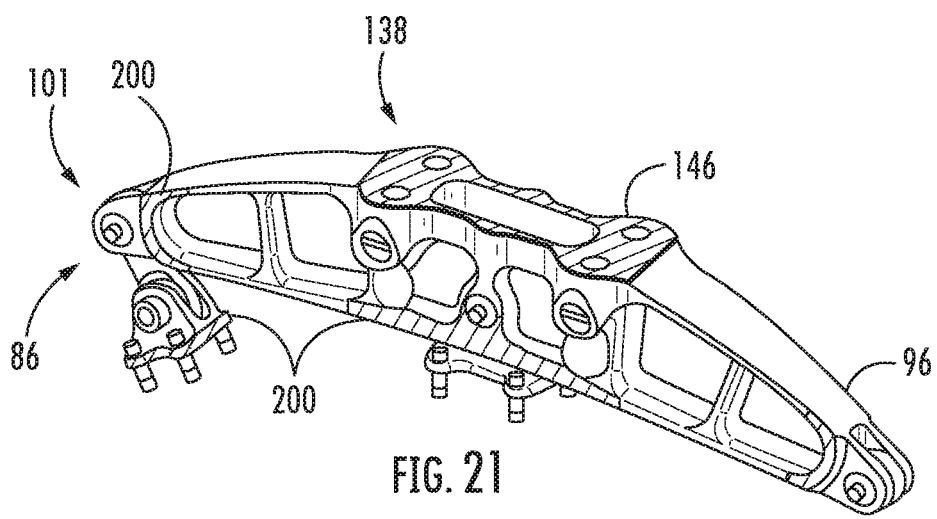
FIG. 21 illustrates a pictorial view of another embodiment of the vibration isolation system in accordance with aspects of the present subject matter, particularly illustrating an isolator configured to be arranged between the front mount member of the mount structure and the associated pylon of the gas turbine engine.

Though the vibration isolation system 138 has been described above in reference to reducing vibrations and/or loads transferred between the fixed frame of the gas turbine engine 10 and the engine mount structure 101 and/or the engine component 176, it should appreciated that the vibration isolation system 138 may be utilized to reduce such vibrations and/or loads transferred between any two fixed structures 140, 142 associated with a gas turbine engine. For example, as shown in FIG. 21, the vibration isolation system 138 may be utilized between the engine mount structure 101 and the pylon 82 (see FIG. 2). More particularly, in the exemplary embodiment of FIG. 21, an isolator 146 (shown as a coating or plate including an SMA material in FIG. 21) of the vibration isolation system 138 may be arranged between the front mount member 96 and the pylon 82. However, it should be appreciated that the vibration isolation system 138 may be utilized between any two fixed structures between the gas turbine engine 10 and the aircraft (e.g., any two fixed structures connected between the gas turbine engine 10 and the wing 80).

Figure 22:
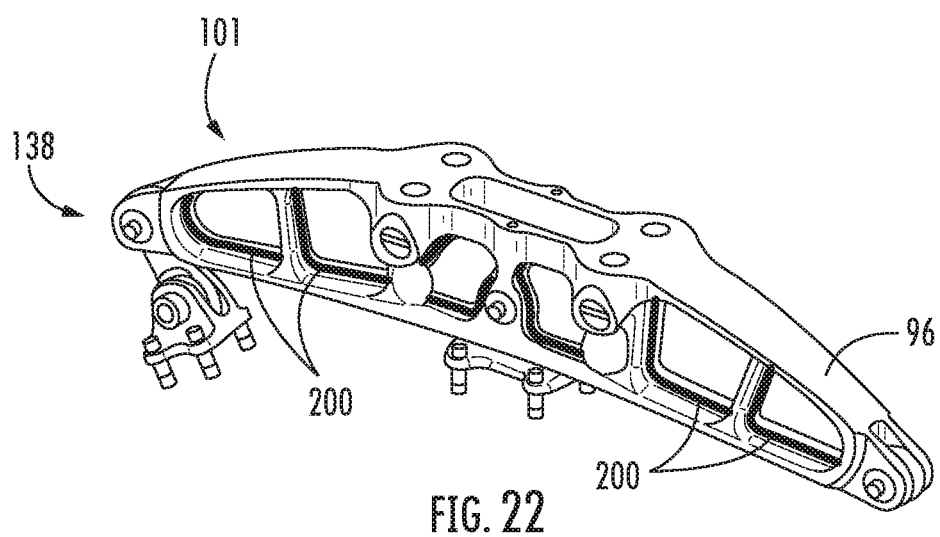
FIG. 22 illustrates a pictorial view of a further embodiment of the vibration isolation system including external dampers in accordance with aspects of the present subject matter, particularly illustrating the external dampers on an external surface of the front mount member.
Figure 23:
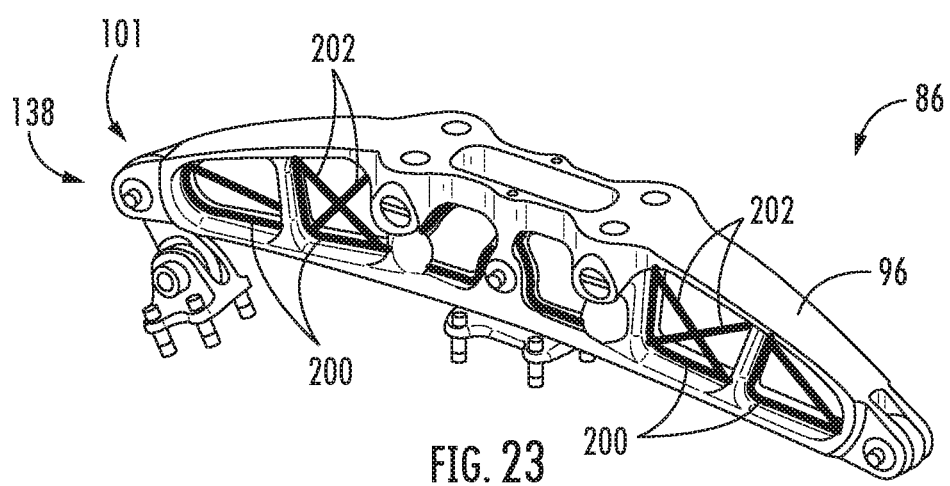
FIG. 23 illustrates a pictorial view of a further embodiment of the vibration isolation system including external dampers in accordance with aspects of the present subject matter, particularly illustrating the external dampers configured as cross-beams of the front mount member.

Referring now to FIGS. 21-23, various embodiments of the vibration isolation system 138 including one or more external dampers 200 including one or more SMA materials are illustrated in accordance with aspects of the present subject matter. Particularly, FIGS. 21-23 illustrate the external dampers 200 applied to an external surface of the engine mount structure 101. However, it should be appreciated that such external dampers 200 may be applied to the external surface of any first or second fixed structure 140, 142 of the vibration isolation system 138, such as the fixed frame of the gas turbine engine 10 or the engine component 176. Moreover, the external damper(s) 200 may generally absorb and therefore reduce vibration acting on the first and/or second fixed structures 140, 142 that the external damper(s) 200 are applied or associated with.

As shown in the exemplary embodiments of FIGS. 21-23 the external damper(s) 200 may be applied to the external surface of the front mount member 96. The external damper(s) 200 may generally include a coating including one or more SMA materials. In additional or alternative embodiments, the external damper(s) 200 may include one or more SMA strips, plates, cutaways, molds, or the like applied to or adhered to the external surface of the front mount member 96. For instance, as shown, the external damper(s) 200 may be applied to one or more fillets of the front mount member 96. In another embodiment, as shown particularly in reference to FIG. 23, the one or more external dampers 200 may be configured as cross-beams 202 extending across one or more voids or cavities defined in the front mount member 96. For example, the cross beam(s) 202 may be coupled to the front mount member 96, integrally coupled with the front mount member 96, and/or formed integrally with the front mount member 96.

In general, the exemplary embodiments of the vibration isolation system 138 and SMA isolators 146, described herein, may be manufactured or formed using any suitable process. For instance, the isolator(s) 146 or components thereof may be stamped or formed from laser electric discharge machining (EDM), milling, etc. However, in accordance with several aspects of the present subject matter, the isolator(s) 146 may be formed using an additive-manufacturing process, such as a 3D printing process, or via casting. The use of such processes may allow the isolator(s) 146 to be formed integrally and/or integrally coupled with other components of the support assembly, as a single monolithic component, or as any suitable number of sub-components. Forming the isolator(s) 146 via additive manufacturing may allow the isolator(s) 146 to be integrally formed and include a variety of features not possible when using prior manufacturing methods. For example, the additive manufacturing methods described herein enable the manufacture of the links (e.g., links 148, 150), tabs 160, sleeves 166, stacked elements 180, washers 178, external dampers 200 and/or the like having any suitable size and shape with one or more configurations, some of these novel features are described herein.

As used herein, the terms "additive manufacturing," "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, in various embodiments of the SMA isolator(s) 146 described herein, the material may include an SMA material. Further, in accordance with other exemplary embodiments of the present subject matter, the additively manufactured components described herein may be formed at least in part of materials including but not limited to pure metals, nickel alloys, chrome alloys, titanium, titanium alloys, magnesium, magnesium alloys, aluminum, aluminum alloys, iron, iron alloys, stainless steel, nickel or cobalt based superalloys (e.g., those available under the name Inconel® available from Special Metals Corporation), as well as SMA materials described herein. These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the isolator(s) 146. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the SMA isolator(s) 146 described herein. For example, such components may include thin additively manufactured layers and structures. In addition, the additive manufacturing process enables the manufacture of a single component having different materials such that different portions of the component may exhibit different performance characteristics, such as forming all or part of the isolator(s) 146 from one or more SMA materials. The successive, additive nature of the manufacturing process enables the construction of these novel features. As a result, the vibration isolation system 138 and/or SMA isolator(s) 146 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A vibration isolation system for a gas turbine engine, the vibration isolation system comprising a first fixed structure; a second fixed structure separate from the first fixed structure; a connector coupling the first fixed structure to the second fixed structure; and an isolator, including a shape memory alloy material, associated with the connector and arranged between the first fixed structure and the second fixed structure such that the isolator reduces vibrations transferred between the first fixed structure and the second fixed structure.

2. The vibration isolation system of any preceding clause, wherein the first fixed structure comprises a fixed frame of the gas turbine engine.

3. The vibration isolation system of any preceding clause, wherein the second fixed structure comprises an engine component associated with the gas turbine engine.

4. The vibration isolation system of any preceding clause, wherein the second fixed structure comprises an engine mount structure.

5. The vibration isolation system of any preceding clause, wherein the connector comprises the isolator.

6. The vibration isolation system of any preceding clause, wherein the isolator comprises at least one of a link, a tab, or a coating applied to an exterior surface of at least one of the first fixed structure, the second fixed structure, or the connector.

7. The vibration isolation system of any preceding clause, wherein the link comprises segments, at least one of which includes the shape memory alloy material.

8. The vibration isolation system of any preceding clause, wherein the isolator comprises a washer.

9. The vibration isolation system of any preceding clause, wherein the washer comprises a first ring, a second ring axially aligned with the first ring, and a plurality of members extending between the first ring and the second ring.

10. The vibration isolation system of any preceding clause, wherein at least one member defines an angle relative to an axial axis of the washer.

11. The vibration isolation system of any preceding clause, wherein two or more members of the plurality of members define an "X" pattern.

12. The vibration isolation system of any preceding clause, wherein the plurality of members define a mesh extending between the first ring and the second ring.

13. The vibration isolation system of any preceding clause, wherein at least one member of the plurality of members includes two or more ligaments.

14. The vibration isolation system of any preceding clause, wherein at least one ligament is configured as a bumper.

15. The vibration isolation system of any preceding clause, wherein the washer defines at least one slot recessed within the washer.

16. The vibration isolation system of any preceding clause, wherein the washer includes an insert within the at least one slot.

17. The vibration isolation system of any preceding clause, wherein the connector comprises at least one of a bolt or pin, and wherein the isolator comprises a sleeve arranged along an exterior surface of the at least one of the bolt or pin.

18. The vibration isolation system of any preceding clause, wherein the isolator comprises a plurality of sleeves arranged along the exterior surface of the at least one of the bolt or pin.

19. The vibration isolation system of any preceding clause, wherein the isolator further comprises at least one wedge arranged between adjacent sleeves of the plurality of sleeves.

20. The vibrations isolation system of any preceding clause, wherein the isolator is prestressed.

21. A vibration isolation system for a component of a gas turbine engine, the vibration isolation system comprising a fixed frame of the gas turbine engine; an engine component associated with the gas turbine engine; at least one connector coupling the engine component to the fixed frame; and at least one isolator, including a shape memory alloy material, associated with the at least one connector and arranged between the fixed frame and the engine component such that the at least one isolator reduces vibrations transferred between the fixed frame and the engine component.

22. The vibration isolation system of any preceding clause, wherein the connector comprises the isolator.

23. The vibration isolation system of any preceding clause, wherein the at least one isolator comprises at least one of a washer, a link, or a coating applied to an exterior surface of at least one of the fixed frame, the engine component, or the at least one connector.

24. The vibration isolation system of any preceding clause, wherein the link comprises segments, at least one of which includes the shape memory alloy material.

25. The vibration isolation system of any preceding clause, wherein the washer comprises a first ring, a second ring axially aligned with the first ring, and a plurality of members extending between the first ring and the second ring.

26. The vibration isolation system of any preceding clause, wherein at least one member defines an angle relative to an axial axis of the washer.

27. The vibration isolation system of any preceding clause, wherein two or more members of the plurality of members define an "X" pattern.

28. The vibration isolation system of any preceding clause, wherein the plurality of members define a mesh extending between the first ring and the second ring.

29. The vibration isolation system of any preceding clause, wherein at least one member of the plurality of members includes two or more ligaments.

30. The vibration isolation system of any preceding clause, wherein at least one ligament is configured as a bumper.

31. The vibration isolation system of any preceding clause, wherein the washer defines at least one slot recessed within the washer.

32. The vibration isolation system of any preceding clause, wherein the washer includes an insert within the at least one slot.

33. The vibration isolation system of any preceding clause, wherein the connector comprises at least one of a bolt or pin, and wherein the isolator comprises a sleeve arranged along an exterior surface of the at least one of the bolt or pin.

34. The vibration isolation system of any preceding clause, wherein the isolator comprises a plurality of sleeves arranged along the exterior surface of the at least one of the bolt or pin.

35. The vibration isolation system of any preceding clause, wherein the isolator further comprises at least one wedge arranged between adjacent sleeves of the plurality of sleeves.

36. The vibrations isolation system of any preceding clause, wherein the isolator is prestressed.

37. A vibration isolation system for an engine mount of a gas turbine engine, the vibration isolation system comprising a fixed frame of the gas turbine engine; an engine mount structure; at least one connector coupling the fixed frame to the engine mount structure; and at least one isolator, including a memory shape alloy material, associated with the at least one connector and arranged between the fixed frame and the engine mount structure such that the at least one isolator reduces vibrations transferred between the fixed frame and the engine mount structure.

38. The vibration isolation system of any preceding clause, wherein the connector comprises the isolator.

39. The vibration isolation system of any preceding clause, wherein the at least one isolator comprises at least one link, tab, or sleeve.

40. The vibration isolation system of any preceding clause, wherein the link comprises segments, at least one of which includes the shape memory alloy material.

41. The vibration isolation system of any preceding clause, wherein the isolator comprises a washer.

42. The vibration isolation system of any preceding clause, wherein the washer comprises a first ring, a second ring axially aligned with the first ring, and a plurality of members extending between the first ring and the second ring.

43. The vibration isolation system of any preceding clause, wherein at least one member defines an angle relative to an axial axis of the washer.

44. The vibration isolation system of any preceding clause, wherein two or more members of the plurality of members define an "X" pattern.

45. The vibration isolation system of any preceding clause, wherein the plurality of members define a mesh extending between the first ring and the second ring.

46. The vibration isolation system of any preceding clause, wherein at least one member of the plurality of members includes two or more ligaments.

47. The vibration isolation system of any preceding clause, wherein at least one ligament is configured as a bumper.

48. The vibration isolation system of any preceding clause, wherein the washer defines at least one slot recessed within the washer.

49. The vibration isolation system of any preceding clause, wherein the washer includes an insert within the at least one slot.

50. The vibration isolation system of any preceding clause, wherein the engine mount structure comprises a fan frame yoke, wherein the at least one connector comprises a platform, wherein the at least one isolator comprises a tab arranged between the platform and the fixed frame.

51. The vibration isolation system of any preceding clause, wherein the engine mount structure comprises a rear mount member, wherein the at least one connector and at least one isolator together comprise a link coupled between the rear mount member and the fixed frame.

52. The vibration isolation system of any preceding clause, wherein the engine mount structure comprises a front mount member, wherein the at least one connector comprises at least one of a bolt or pin, and wherein the at least one isolator comprises a sleeve arranged along an exterior surface of the at least one of the bolt or pin.

53. The vibration isolation system of preceding clause, wherein the at least one isolator comprises a plurality of sleeves arranged along an exterior surface of the at least one bolt or pin, and wherein the at least one isolator further comprises at least one wedge arranged between adjacent sleeves of the plurality of sleeves.

54. The vibrations isolation system of any preceding clause, wherein the isolator is prestressed.

55. The vibration isolation system of any preceding clause, further comprising an external damper.

56. The vibration isolation system of any preceding clause, wherein the external damper comprises a coating including the shape memory alloy material.

57. The vibration isolation system of any preceding clause, wherein the external damper comprises at least one of a strip, plate, cutaway, mold, or the like including the shape memory alloy material.

58. The vibration isolation system of any preceding clause, wherein the external damper comprises a cross beam.

What is claimed is:

1. A vibration isolation system for a gas turbine engine, the vibration isolation system comprising:
   a first fixed structure;
   a second fixed structure separate from the first fixed structure;
   a connector coupling the first fixed structure to the second fixed structure; and
   an isolator, including a shape memory alloy material, associated with the connector and arranged between the first fixed structure and the second fixed structure such that the isolator reduces vibrations transferred between the first fixed structure and the second fixed structure.

2. The vibration isolation system of claim 1, wherein the first fixed structure comprises a fixed frame of the gas turbine engine.

3. The vibration isolation system of claim 2, wherein the second fixed structure comprises an engine component associated with the gas turbine engine.

4. The vibration isolation system of claim 2, wherein the second fixed structure comprises an engine mount structure.

5. The vibration isolation system of claim 1, wherein the connector comprises the isolator.

6. The vibration isolation system of claim 1, wherein the isolator comprises at least one of a link, a tab, or a coating applied to an exterior surface of at least one of the first fixed structure, the second fixed structure, or the connector.

7. The vibration isolation system of claim 1, wherein the isolator comprises a washer.

8. The vibration isolation system of claim 7, wherein the washer comprises a first ring, a second ring axially aligned with the first ring, and a plurality of members extending between the first ring and the second ring.

9. The vibration isolation system of claim 7, wherein the washer defines at least one slot recessed within the washer.

10. The vibration isolation system of claim 1, wherein the connector comprises at least one of a bolt or pin, and wherein the isolator comprises a sleeve arranged along an exterior surface of the at least one of the bolt or pin.

11. The vibration isolation system of claim 10, wherein the isolator comprises a plurality of sleeves arranged along the exterior surface of the at least one of the bolt or pin, and wherein the isolator further comprises at least one wedge arranged between adjacent sleeves of the plurality of sleeves.

12. The vibrations isolation system of claim 1, wherein the isolator is prestressed.

13. A vibration isolation system for a component of a gas turbine engine, the vibration isolation system comprising
a fixed frame of the gas turbine engine;
an engine component associated with the gas turbine engine;
at least one connector coupling the engine component to the fixed frame; and
at least one isolator, including a shape memory alloy material, associated with the at least one connector and arranged between the fixed frame and the engine component such that the at least one isolator reduces vibrations transferred between the fixed frame and the engine component.

14. The vibration isolation system of claim 13, wherein the at least one isolator comprises at least one of a washer, a link, or a coating applied to an exterior surface of at least one of the fixed frame, the engine component, or the at least one connector.

15. A vibration isolation system for an engine mount of a gas turbine engine, the vibration isolation system comprising:
a fixed frame of the gas turbine engine;
an engine mount structure;
at least one connector coupling the fixed frame to the engine mount structure; and
at least one isolator, including a memory shape alloy material, associated with the at least one connector and arranged between the fixed frame and the engine mount structure such that the at least one isolator reduces vibrations transferred between the fixed frame and the engine mount structure.

16. The vibration isolation system of claim 15, wherein the at least one isolator comprises at least one link, tab, or sleeve.

17. The vibration isolation system of claim 15, wherein the engine mount structure comprises a fan frame yoke, wherein the at least one connector comprises a platform, wherein the at least one isolator comprises a tab arranged between the platform and the fixed frame.

18. The vibration isolation system of claim 15, wherein the engine mount structure comprises a rear mount member, wherein the at least one connector and at least one isolator together comprise a link coupled between the rear mount member and the fixed frame.

19. The vibration isolation system of claim 15, wherein the engine mount structure comprises a front mount member, wherein the at least one connector comprises at least one of a bolt or pin, and wherein the at least one isolator comprises a sleeve arranged along an exterior surface of the at least one of the bolt or pin.

20. The vibration isolation system of claim 15, wherein the at least one isolator comprises a plurality of sleeves arranged along an exterior surface of the at least one bolt or pin, and wherein the at least one isolator further comprises at least one wedge arranged between adjacent sleeves of the plurality of sleeves.

* * * * *